United States Patent
Cheng

(10) Patent No.: US 12,196,682 B2
(45) Date of Patent: Jan. 14, 2025

(54) STIMULATED RAMAN PHOTOTHERMAL MICROSCOPE

(71) Applicant: Trustees of Boston University, Boston, MA (US)

(72) Inventor: Ji-Xin Cheng, Newton, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 18/424,128

(22) Filed: Jan. 26, 2024

(65) Prior Publication Data
US 2024/0255429 A1    Aug. 1, 2024

Related U.S. Application Data

(60) Provisional application No. 63/441,297, filed on Jan. 26, 2023.

(51) Int. Cl.
*G01J 3/44* (2006.01)
*G01N 21/65* (2006.01)

(52) U.S. Cl.
CPC ... *G01N 21/65* (2013.01); *G01N 2201/06113* (2013.01); *G01N 2201/105* (2013.01)

(58) Field of Classification Search
CPC ......... G01N 21/65; G01N 2201/06113; G01N 2201/105; G01J 3/44; A61B 5/0075
See application file for complete search history.

(56) References Cited

U.S. PATENT DOCUMENTS

| | | | |
|---|---|---|---|
| 7,542,137 B2 | 6/2009 | Murugkar et al. | |
| 8,681,331 B2 | 3/2014 | Xie et al. | |
| 2005/0084980 A1 | 4/2005 | Koo et al. | |
| 2010/0020318 A1* | 1/2010 | Lee | G01J 3/0237 356/318 |
| 2010/0027000 A1* | 2/2010 | Pestov | G01J 3/44 356/301 |
| 2011/0164246 A1* | 7/2011 | Riddell | G01N 15/1459 356/301 |
| 2014/0361150 A1* | 12/2014 | Cheng | G01J 3/2803 250/214 A |
| 2015/0056645 A1* | 2/2015 | Vacca | G01N 15/1459 435/29 |

(Continued)

OTHER PUBLICATIONS

Adhikari et al., "Photothermal Microscopy: Imaging theOptical Absorption of Single Nanoparticlesand Single Molecules," ACS Nano, vol. 14, pp. 16414-16445, 2020.

(Continued)

*Primary Examiner* — Abdullahi Nur
(74) *Attorney, Agent, or Firm* — Cesari and McKenna, LLP; Steven M. Mills

(57) ABSTRACT

A stimulated Raman photothermal (SRP) microscope for imaging a sample. A first optical source omits an intensity-modulated pump beam. A second optical source omits an intensity-modulated Stokes beam. The Stokes beam is combined with the pump beam to form a combined beam. The combined beam is directed to the sample to induce a thermal effect caused by the stimulated Raman process. A third optical source emits a probe beam, the probe beam is directed to the sample. An optical detector detects modulation of the probe beam after modulation by the sample to measure an SRP signal.

20 Claims, 24 Drawing Sheets

(56) References Cited

U.S. PATENT DOCUMENTS

2022/0074861 A1  3/2022  Cheng et al.

OTHER PUBLICATIONS

Andrade et al., "Quantum-enhanced continuous-wave stimulated Raman scattering spectroscopy," Optica, vol. 7, No. 5, pp. 470-475, 2020.
Ao et al., "Stimulated Raman Scattering Microscopy Enables Gleason Scoring of Prostate Core Needle Biopsy by a Convolutional Neural Network," Cancer Res., vol. 83, No. 4, pp. 641-651, 2023.
Bai et al., "Bond-selective imaging by optically sensing the mid-infrared photothermal effect," Sci. Adv., vol. 7, pp. 1-14, 2021.
Bowen & Sahu, "The Effect of Temperature on Fluorescence of Solutions," J. Phys. Chem., vol. 63, pp. 4-7, 1959.
Chen et al., "Multiplexed live-cell profiling with Raman probes," Nature Communications, vol. 12, No. 3405, pp. 1-13, 2021.
Cheng & Xie, "Vibrational spectroscopic imaging of living systems: An emerging platform for biology and medicine," Science, vol. 350, Iss. 6264, pp. 1-11, 2015.
Du et al., "Raman-guided subcellular pharmaco-metabolomics for metastatic melanoma cells," Nature Communications, vol. 11, No. 4830, pp. 1-16, 2020.
Figueroa et al., "Real-Time Microscale Temperature Imaging by Stimulated Raman Scattering," J. Phys. Chem. Lett., vol. 11, pp. 7083-7089, 2020.
Freudiger et al., "Label-Free Biomedical Imaging with High Sensitivity by Stimulated Raman Scattering Microscopy," Science, vol. 322, pp. 1857-1861, 2008.
Gaiduk et al., "Detection limits in photothermal microscopy," Chem. Sci., vol. 1, pp. 343-350, 2010.
Gaiduk et al., "Room-Temperature Detection of aSingle Molecule's Absorption by Photothermal Contrast," Science, vol. 330, pp. 353-356, 2010.
Ge et al., "SRS-FISH: A high-throughput platform linking microbiome metabolism to identity at the single-cell level," PNAS, vol. 119, No. 26, pp. 1-12, 2022.
Hu et al., "Vibrational Imaging of Glucose Uptake Activity in Live Cells and Tissues by Stimulated Raman Scattering," Angew. Chem. Int. Ed., vol. 54, pp. 9821-9825, 2015.
Huang et al., "Multiplex Stimulated Raman Scattering Imaging Cytometry Reveals Lipid-Rich Protrusions in Cancer Cells under Stress Condition," iScience, pp. 1-41, 2020.
Ji et al., "Detection of human brain tumor infiltration with quantitative stimulated Raman scattering microscopy," Science Translational Medicine, vol. 7, Iss. 309, pp. 1-11, 2015.
Lee et al., "Multimodal Metabolic Imaging Reveals Pigment Reduction and Lipid Accumulation in Metastatic Melanoma," BME Frontiers, vol. 2021, pp. 1-17, 2021.
Lee et al., "Visualizing Subcellular Enrichment of Glycogen in Live Cancer Cells by Stimulated Raman Scattering," Analytical Chemistry, pp. 1-22, 2020.
Li & Cheng, "Direct Visualization of De novo Lipogenesis in Single Living Cells," Scientific Reports, vol. 4, No. 6807, pp. 1-8, 2014.
Li et al., "Fluorescence-Detected Mid-Infrared Photothermal Microscopy," J. Am. Chem. Soc., vol. 143, pp. 10809-10815, 2021.
Li et al., "Lipid Desaturation Is a Metabolic Marker and Therapeutic Target of Ovarian Cancer Stem Cells," Cell Stem Cell, vol. 20, pp. 1-12, 2017.
Liao et al., "Microsecond scale vibrational spectroscopic imaging by multiplex stimulated Raman scattering microscopy," Light: Science & Applications, vol. 4, pp. 1-9, 2015.
Min et al., "Coherent Nonlinear Optical Imaging: Beyond Fluorescence Microscopy," Annu. Rev. Phys. Chem., vol. 62, pp. 507-530, 2011.
Novais et al., "Determination of thermo-optic coefficient of ethanol-water mixtures with optical fiber tip sensor," Optical Fiber Technology, vol. 45, pp. 276-279, 2018.
Rock et al., "Near shot-noise limited hyperspectral stimulated Raman scattering spectroscopy using low energy lasers and a fast CMOS array," Optics Express, vol. 21, No. 13, pp. 15113-15120, 2013.
Sauerbrei, "Diagnosis, antiviral therapy, and prophylaxis of varicella-zoster virus infections," Eur. J. Clin. Microbiol. Infect. Dis., vol. 35, pp. 723-734, 2016.
Shi et al., "Optical imaging of metabolic dynamics in animals," Nature Communications, vol. 9, No. 2995, pp. 1-17, 2018.
Shi et al., "Optical mapping of biological water in single live cells by stimulated Raman excited fluorescencemicroscopy," Nature Communications, vol. 10, No. 4764, pp. 1-8, 2019.
Soleilhac et al., "Temperature Response of Rhodamine B-Doped Latex Particles. From Solution to Single Particles," Langmuir, vol. 32, pp. 4052-4058, 2016.
Tan et al., "Metabolic reprogramming from glycolysis tofatty acid uptake and beta-oxidation inplatinum-resistant cancer cells," Nature Communications, vol. 13, No. 4554, pp. 1-16, 2022.
Wang et al., "Experimental observation and theoretical analysis of Raman resonance-enhanced photodamage in coherent anti-Stokes Raman scattering microscopy," J. Opt. Soc. Am. B, vol. 24, No. 3, pp. 544-552, 2007.
Wei & Min, "Electronic Preresonance Stimulated Raman Scattering Microscopy," J. Phys. Chem. Lett., vol. 9, pp. 4294-4301, 2018.
Xia et al., "Mid-Infrared Photothermal Microscopy: Principle, Instrumentation, and Applications," J. Phys. Chem. B., vol. 126, pp. 8597-8613, 2022.
Xiong et al., "Stimulated Raman excited fluorescencespectroscopy and imaging," Nature Photonics, vol. 13, pp. 412-417, 2019.
Xu et al., "Quantum-enhanced stimulated Raman scattering microscopy in a high-power regime," Optics Letters, pp. 1-6, 2022.
Yin et al., "Nanosecond-resolution photothermal dynamicimaging via MHZ digitization and match filtering," Nature Communications, vol. 12, No. 7097, pp. 1-11, 2021.
Yue et al., "Cholesteryl Ester Accumulation Induced by PTEN Loss and PI3K/AKT Activation Underlies Human Prostate Cancer Aggressiveness," Cell Metabolism, vol. 19, pp. 393-406, 2014.
Zhang et al., "Fluorescence-Detected Mid-Infrared Photothermal Microscopy," J. Am. Chem. Soc., vol. 143, pp. 11490-11499, 2021.
Zhang et al., "Rapid Determination of Antimicrobial Susceptibility by Stimulated Raman Scattering Imaging of D2O Metabolic Incorporation in a Single Bacterium," Adv. Sci., vol. 7, pp. 1-14, 2020.
Zhuge et al., "Ultrasensitive Vibrational Imaging of Retinoids by Visible Preresonance Stimulated Raman Scattering Microscopy," Adv. Sci., vol. 8, pp. 1-11, 2021.
Zong et al., "Plasmon-enhanced stimulated Raman scattering microscopy with single-molecule detection sensitivity," Nature Communications, vol. 10, No. 5318, pp. 1-11, 2019.
Zong et al., "Wide-Field Surface-Enhanced Coherent Anti-Stokes Raman Scattering Microscopy," ACS Photonics, vol. 9, pp. 1042-1049, 2022.
Zhu et al., "Stimulated Raman Photothermal Microscopy towards Ultrasensitive Chemical Imaging," pp. 1-42, 2022.
International Search Report and Written Opinion issued in International Application No. PCT/US2024/013153 on Apr. 19, 2024.

* cited by examiner

| Thermal property | Unit | DMSO | hexane | glycerol | water |
|---|---|---|---|---|---|
| Heat Capacity | J/(kg·K) | 1966 | 2251 | 2400 | 4184 |
| Thermal conductivity | W/(m·K) | 0.200 | 0.124 | 0.283 | 0.598 |
| Thermo-optic coefficient dn/dT ($10^{-4}$) | $K^{-1}$ | -4.93 | -5.20 | -2.30 | -1.13 |
| Refractive index | | 1.479 | 1.375 | 1.473 | 1.333 |
| Relative signal intensity | a.u. | 10.3 | 8.83 | 4.27 | 1 |

FIG. 8

STIMULATED RAMAN PHOTOTHERMAL MICROSCOPE

CROSS REFERENCE TO RELATED APPLICATIONS

This application claims priority to and the benefit of U.S. Provisional Patent Application No. 63/441,297, filed on Jan. 26, 2023, and entitled "Stimulated Raman Photothermal (SRP) Microscopy", the contents of which are incorporated herein by reference as though fully set forth herein.

GOVERNMENT SUPPORT

This invention was made with government support under Grant number R35GM136223, awarded by the National Institutes of Health. The Government has certain rights in this invention.

FIELD OF THE TECHNOLOGY

The subject disclosure relates to microscopy, and particularly to stimulated Raman photothermal (SRP) microscopy.

BACKGROUND OF THE TECHNOLOGY

Stimulated Raman scattering (SRS) microscopy has been sharpened to one of the most powerful tools in the field of label-free imaging. In SRS, two spatial-temporally overlapped laser pulse trains (e.g. 102, 104 of FIG. 1a), namely pump and Stokes, overlap in space and time. They interact coherently with Raman-active molecules resonating at the laser beating frequency, leading to a stimulated Raman gain in the Stokes field and loss in the pump field. SRS provides the same molecular vibrational features as conventional Raman spectroscopy but achieves up to six orders of magnitude faster acquisition. This speed improvement, together with the development of vibrational probes, has enabled a wide range of applications. These include label-free stimulated Raman histology, nutrient mapping, the study of altered cancer metabolism), the resolution of heterogeneity in the microbiome, and the rapid detection of antimicrobial susceptibility. However, despite these advances, SRS faces inherent challenges in detection sensitivity due to the small modulation depth (<0.1% for a pure liquid) and the shot noise in the pump or Stokes beam. Simply increasing the number of photons can easily exceed the sample's power tolerance.

Pushing the fundamental limit of SRS sensitivity necessitates either reducing measurement noise or amplifying the signal. To reduce the measurement noise, efforts focused on squeezed light, referred to as "quantum-enhanced SRS." Signal-to-noise ratio (SNR) enhancements of 3.6 dB with continuous wave squeezed light and 2.89 dB with pulsed squeezed light have been demonstrated with no additional perturbation on samples. While promising, this method is limited by low squeeze efficiency and decoherence in complex imaging systems. To amplify the signal, various photophysical processes have been utilized to increase the cross-section. These include electronic pre-resonance SRS, plasmon-enhanced SRS and stimulated Raman excited fluorescence. Exceedingly high enhancement factors ($10^4 \sim 10^7$) of SRS signal and single-molecule SRS measurement have been achieved. However, the requirement of special target molecules or plasmonic nanostructures constrains the scope of applications.

To seek approaches towards boosting the signal, we revisit the physics of SRS from the perspective of energy transfer from laser fields to the sample. As illustrated in FIG. 1B, when pump and Stokes pulses (109, 111, respectively) with appropriate wavelengths interact with Raman-active molecules, the target molecules are pumped to their vibrationally excited states, with the transition energy equal to the beating frequency between the pump and Stokes lasers (see also, steps 602-604 of method 600 of FIG. 6a. Importantly, after SRS excitation, the vibrationally excited molecules relax their vibrational energy quickly through non-radiative decay (step 606 of method 600). Consequently, this heats up the surrounding environment, causing a stimulated Raman photothermal (SRP) effect (step 608 of method 600). From the perspective of photodamage in CARS imaging, ~0.08% of the laser power is absorbed by a myelin sample through the simultaneously occurring stimulated Raman gain and loss processes, as seen in previous work.

Optically detected photothermal microscopy has been well-developed and has reached the sensitivity down to single-molecule level. In photothermal spectroscopy, first reported in the 1970s, optical absorption raises the local temperature and induces a local change of refractive index, which is then measured with a probing beam. Early photothermal microscopy research focused on electronic absorption, targeting non-fluorescent dye molecules or metal nanostructures. Recently developed mid-infrared photothermal (MIP) microscopy provides universal infrared-active vibrational spectroscopic features. It offers detection sensitivity at the micromolar level and achieves spatial resolution at the visible diffraction limit. Furthermore, by probing high harmonic signals, it can even achieve higher resolution. On the contrary, the thermal effects induced by a Raman process are commonly believed to be minimal due to the small cross sections of Raman scattering.

Additionally, fiber lasers are pivotal in the translational application of microscopy systems, with their advantages of environmental robustness and fast wavelength tuning. Using a rapid tunable dual-output all-fiber optical parametric oscillator, SRS can now be executed with a portable fiber laser, covering a broad spectrum range (700-3100 cm$^{-1}$) where an auto-balance detection system is needed for canceling out the high laser noise in the fiber laser. However, the auto-balancing setup is sophisticated and prone to electronics interference from the environment, limiting sensitivity in fiber laser-based SRS systems. Another challenging facing SRS is the cross phase modulation background. A high NA objective is needed for signal collection to minimize this background, making the operation not friendly to non-expert users.

SUMMARY OF THE TECHNOLOGY

In light of the needs described above, in the present disclosure, systems and methods are disclosed for an SRP microscope which challenge this conventional understanding through low duty cycle coherent Raman excitation that nonlinearly benefits from high laser peak power. We show the substantial thermal effect of an SRS process and demonstrate its potential in bond-selective imaging with ultrahigh sensitivity.

In at least one aspect, a system and method of SRP microscopy is disclosed herein with superior sensitivity than SRS, accomplished by measuring the thermal lensing effect caused by SRP effect. We simulate that the SRP effect could induce Kelvin scale temperature rise at the focal center of SRS and confirm the simulation result with fluorescence thermometer measurement. On the basis, we build an SRP microscope by measuring the thermal lensing effect of SRP. Surprisingly high modulation depth (~22.3%) is observed in SRP measurement, much higher than in SRS (~0.04%) with identical average laser power. Arising from the high modulation depth, very high sensitivity is obtained from SRP microscope. We also demonstrate the versatile applications of SRP microscopy in bio-imaging at different spatial scales and Raman bands.

In at least one aspect, disclosed herein is an SRP microscopy system which implements a simplified fiber laser probe beam utilized for the SRP signal and an air condenser for probe beam collection.

BRIEF DESCRIPTION OF THE DRAWINGS

So that those having ordinary skill in the art to which the disclosed system pertains will more readily understand how to make and use the same, reference may be had to the following drawings.

FIG. 2b is a graph of the measured SRP signal as a function of modulation duty cycle of the microscope of FIG. 2a.

FIG. 2c is a graph of measured SRP signal as a function of modulation frequency of the microscope of FIG. 2a.

FIG. 2d is a graph of traces that were obtained using the microscope of FIG. 2a.

FIG. 4b is shaded, coded image of the image of FIG. 4a.

FIG. 5b is a graph of a single virus Raman spectrum at the C—H region, acquired from the single virus of FIG. 5a.

FIG. 8 is a table of properties of various liquid medium for use within a microscope in accordance with the subject technology.

DETAILED DESCRIPTION

Figure 1B:
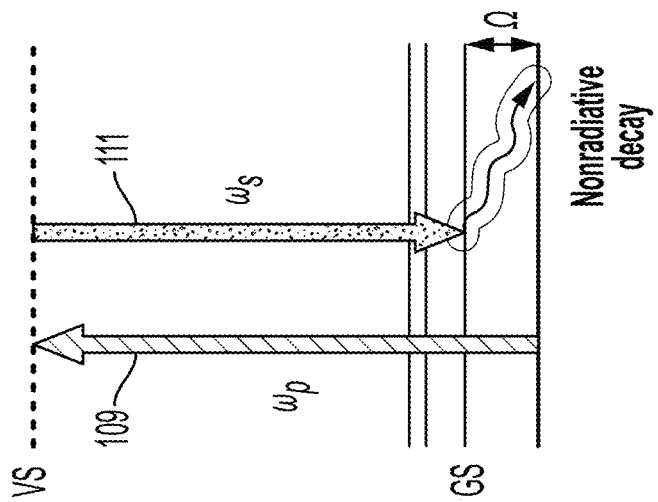
FIG. 1b is a schematic of the SRP effect.

The subject technology overcomes many of the prior art problems associated with stimulated Raman microscopy. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always at a higher elevation).

Figure 1A:
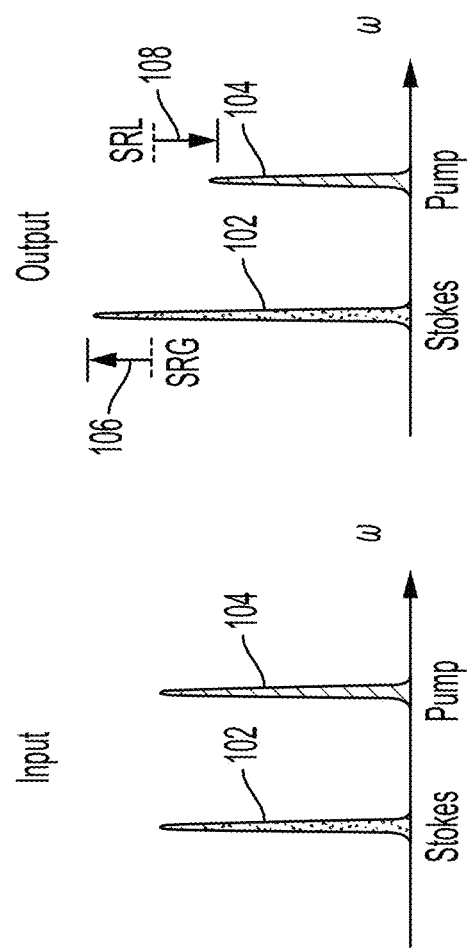
FIG. 1a. is a schematic of stimulated Raman gain and loss.
Figure 1D:
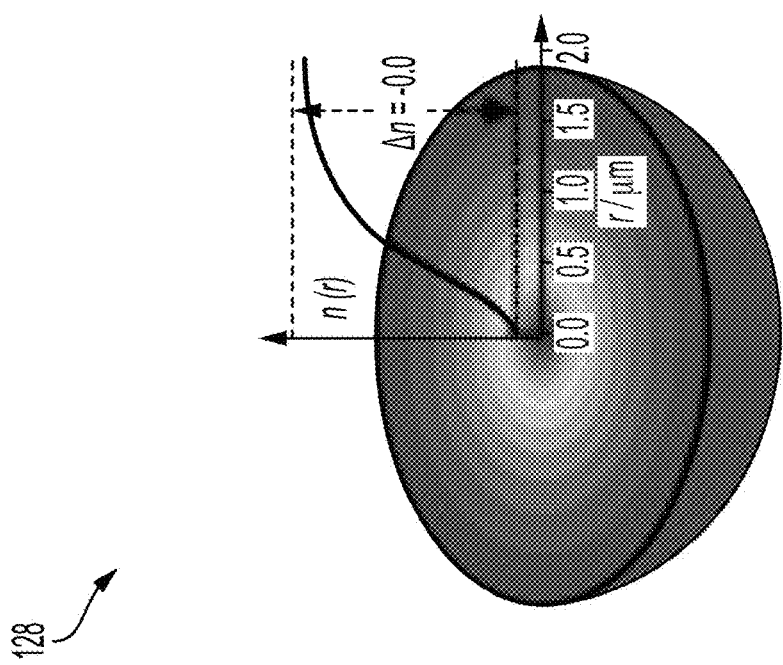
FIG. 1d is a simulated profile of thermal lens induced by SRP in pure DMSO.
Figure 1C:
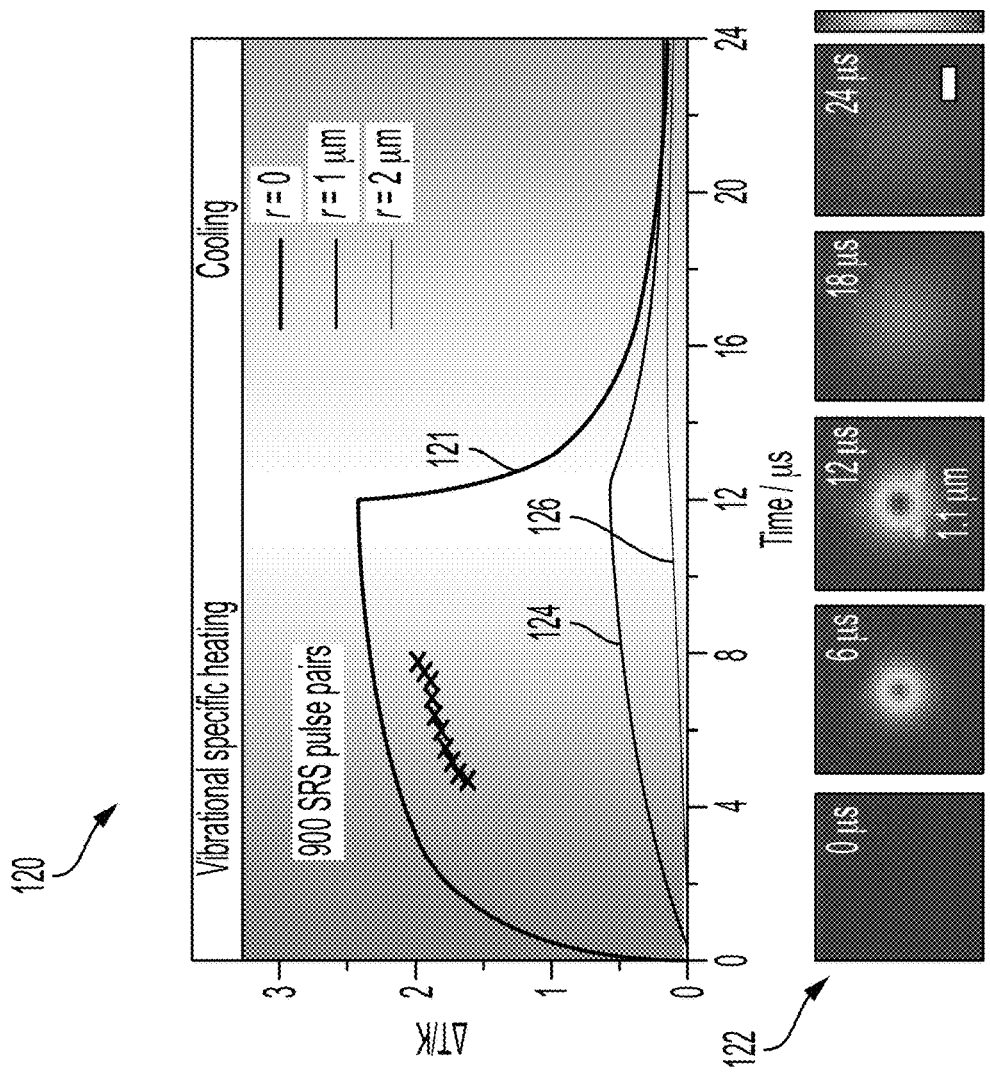
FIG. 1c is a graph of a simulation of temperature rise induced by SRP in temporal and spatial domains.
Figures 1E, 1F:
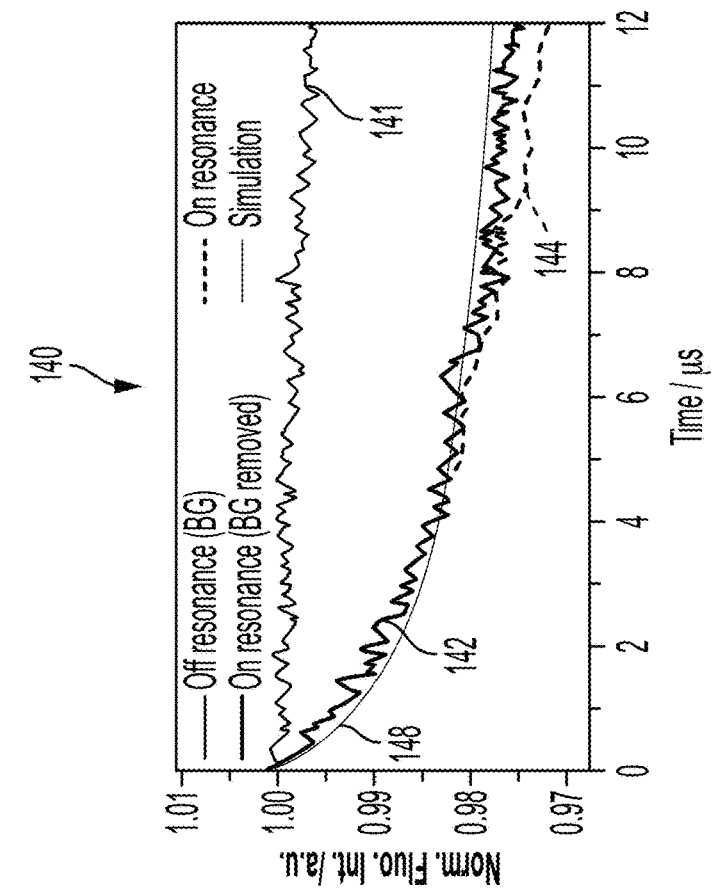
FIG. 1e is an illustration of fluorescence thermometer measurement of SRP-mediated temperature rise.
FIG. 1f is a graph of Fluorescence intensity of rhodamine B in DMSO during an SRS process.

Referring now to FIGS. 1a-1f, the theoretical simulation and experimental observation of the SRP effect is shown. More particularly, FIG. 1a shows a schematic of an exemplary pump 102 and stokes pulse 104, and stimulated Raman gain 106 and loss 108. FIG. 1b is a schematic of the stimulated Raman photothermal (SRP) effect. FIG. 1c shows a simulation of temperature rise induced by SRP in temporal (graph 120) and spatial (images 122) domains, with a spatial scale bar: 1 m. FIG. 1d is a simulated profile 128 of thermal lens induced by SRP in pure DMSO. FIG. 1e shows the illustration of fluorescence thermometer measurement of SRP-mediated temperature rise with SRS off (130) and SRS on (132). FIG. 1f is a graph 140 of fluorescence intensity of rhodamine B in DMSO during an SRS process. The beating frequency ($\omega_p$-$\omega_s$) is tuned to 2913 cm$^{-1}$ for on resonance and 2850 cm$^{-1}$ for off resonance (background: BG). The on resonance (BG removed) curve 142 is obtained by subtracting the off resonance (BG, graph line 141) from the on resonance curve (dotted line 144), to eliminate the non-photothermal contributions.

In a stimulated Raman loss measurement, the relationship between the modulation depth of pump beam ($\eta$), the pump laser intensity (I_p), and change of photon number per pulse ($\Delta$N) can be expressed as:

$$\frac{\eta I_p}{2} = \Delta N \cdot \hbar \omega_p \cdot f_{rep}$$

where $\hbar$ is the reduced Plank's constant, $\omega_p$ is the angular frequency of the pump field, and $f_{rep}$ is the laser repetition rate. The factor of 2 accounts for the 50% duty cycle. With this, one can estimate the energy deposition per pair of SRS pulses using $\Delta N \cdot \hbar \omega_R$, where $\omega_R$ is the target Raman shift. Literature has shown that with 25 mW (modulated at 50% duty cycle) for the Stokes beam and 15 mW for the pump beams on sample at 80 MHz, the SRS modulation depth on the 2913 cm$^{-1}$ mode of dimethyl sulfoxide (DMSO) reaches 0.04%. By substituting these measured values into the equations, the energy deposition per pair of laser pulses is calculated to be 8.7 fJ, equivalent to 0.7 μW with 12.5 ns pulse spacing. This substantial energy deposition aligns with Min's calculation of the apparent cross-section of SRS.

Figure 6A:
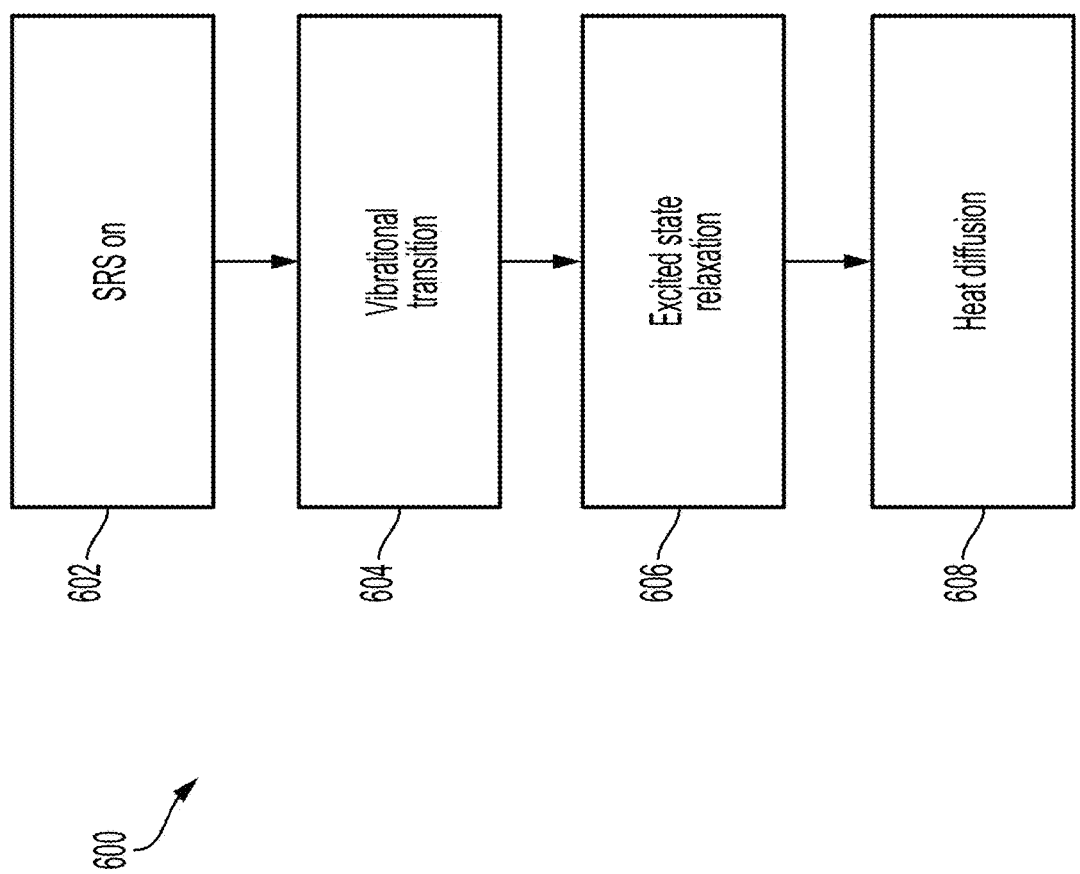
FIG. 6a is a flowchart of the thermal effect generation in an SRP microscope.
Figure 6B:
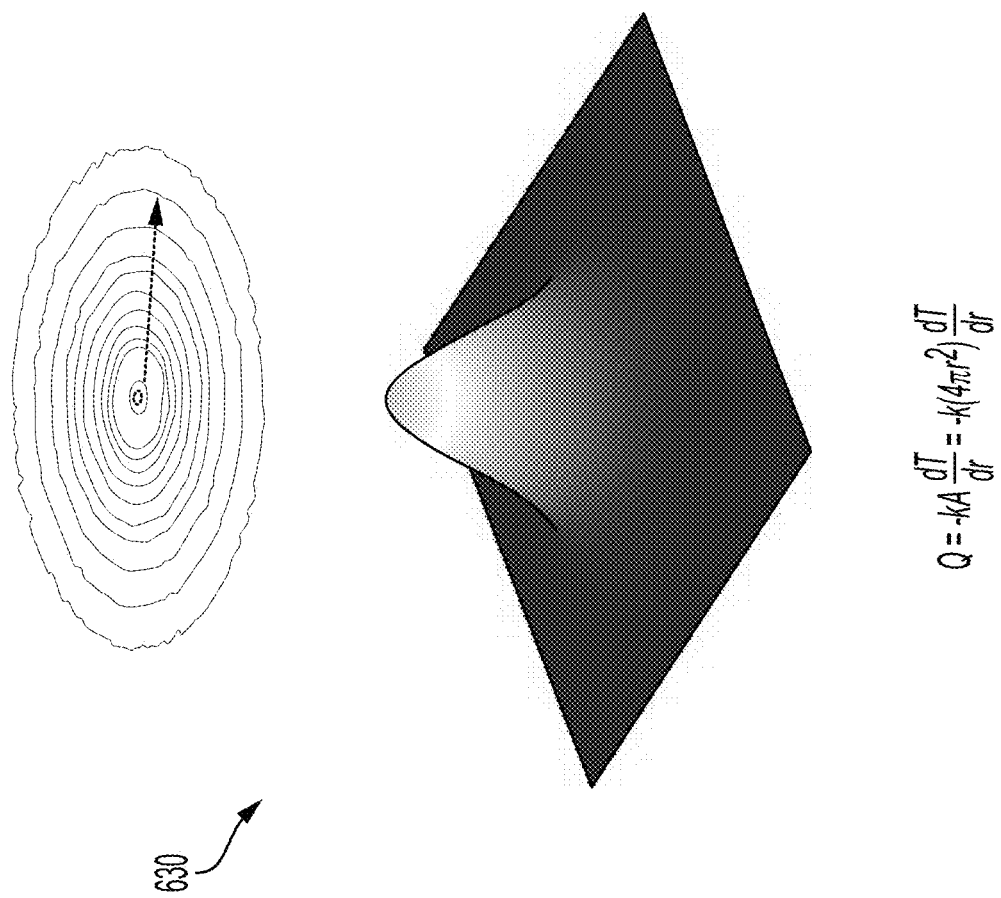
FIG. 6b is a schematic of a heat diffusion model for SRP induced thermal effect with a microscope as disclosed herein, with an arrow showing the thermal propagation direction.

With this energy deposition estimation, we applied Fourier's law and built a finite element model 630 (FIG. 6b) to quantitatively simulate the stimulated Raman induced temperature rise in pure DMSO. Simulation results (graph 120) show that, when using a 0.8 numerical aperture (NA) objective alongside the routinely used laser power for SRS (25 mW for pump, 50 mW for Stokes, 80 MHz repetition rate, and 50% duty cycle), the temperature rise at the center of the laser focus can reach as high as 2.4 K (graph line 121) after 12 μs of stimulated Raman excitation, corresponding to 960 pairs of pump/Stokes pulses. At t=12 s, the temperature rises at 1 μm (graph line 124) and 2 μm (graph line 126) away from the focal center are 0.54 K and 0.12 K, respectively. The temperature map at different time points is also shown in graph 120 of FIG. 1c. The full width at half maximum (FWHM) of the temperature rise field at t=12 μs is calculated to be 1.1 μm, suggesting very localized heating.

The temperature elevation subsequently changes the local refractive index via the thermal-optic effect. For pure DMSO with a refractive index of 1.497 and a thermo-optic coefficient of −4.93×10$^{-4}$ K$^{-1}$ (dn/dT), the stimulated Raman induced heating results in a reduction of refractive index by 0.07% at the focal center (t=12 μs). As shown in diagram 128 of FIG. 1d, such an index change nonlinearly extends to the surroundings through heat propagation, thereby giving rise to the formation of a thermal lens. The presence of such a thermal lens builds the foundation for SRP microscopy.

The simulation results were validated using a fluorescence thermometer. The emission intensities of certain fluorophores exhibit temperature dependence. For instance, the fluorescence intensity of Rhodamine B decreases by ~2% per Kelvin at room temperature. This property has been utilized in fluorescence-detected mid-infrared photothermal spectroscopy. Here, we adopt this method to quantify the temperature rise at the SRS focus, using Rhodamine B as a fluorescence thermometer. When the chirped pump and Stokes lasers are focused into a DMSO solution of Rhodamine B, the Rhodamine B molecules at the SRS focus are electronically excited through multiphoton absorption and emit fluorescence. Meanwhile, when the beating frequency between the pump and Stokes is tuned to resonate with the C—H vibration in DMSO, the SRP effect raises the temperature and accordingly decrease the two-photon fluorescence intensity of Rhodamine B molecules (compare image 130 and 132 of FIG. 1e). We used identical parameters as in the simulation. Firstly, the fluorescence intensity change curve measured at off-resonance frequency was subtracted from the on-resonance measurement to remove the photobleaching contribution in the result. Then, we found that the fluorescence intensity dropped ~2.3% after 12 μs of on-resonance SRS, corresponding to ~1.2 K of temperature rise (graph line 144 of FIG. 1f), close to the simulation result of 2.4 K. The difference between the two values could be predominantly due to their different sampling regions. We measured the average temperature rise across the whole laser focus, while the simulation result only showed the temperature rise at the center of the laser focus (~20 nm diameter). After taking weighted-average of temperature increases throughout the heating region and accounting for the two-photon excitation intensity of a Gaussian beam, the fluorescence change curve (graph line 144) aligned closely with the simulation (graph line 148).

To eliminate the potential impact of thermophoresis on the observed fluorescence intensity drop, we performed a control experiment using Rhodamine 800 (Rh800) as the dye in DMSO under the same SRS and two-photon excitation schemes. The fluorescence of Rh800 is not temperature dependent, and not vulnerable to photobleaching. The SRS process did not vary the Rh800 fluorescence intensity, indicating that thermophoresis played a negligible role.

Figure 7:
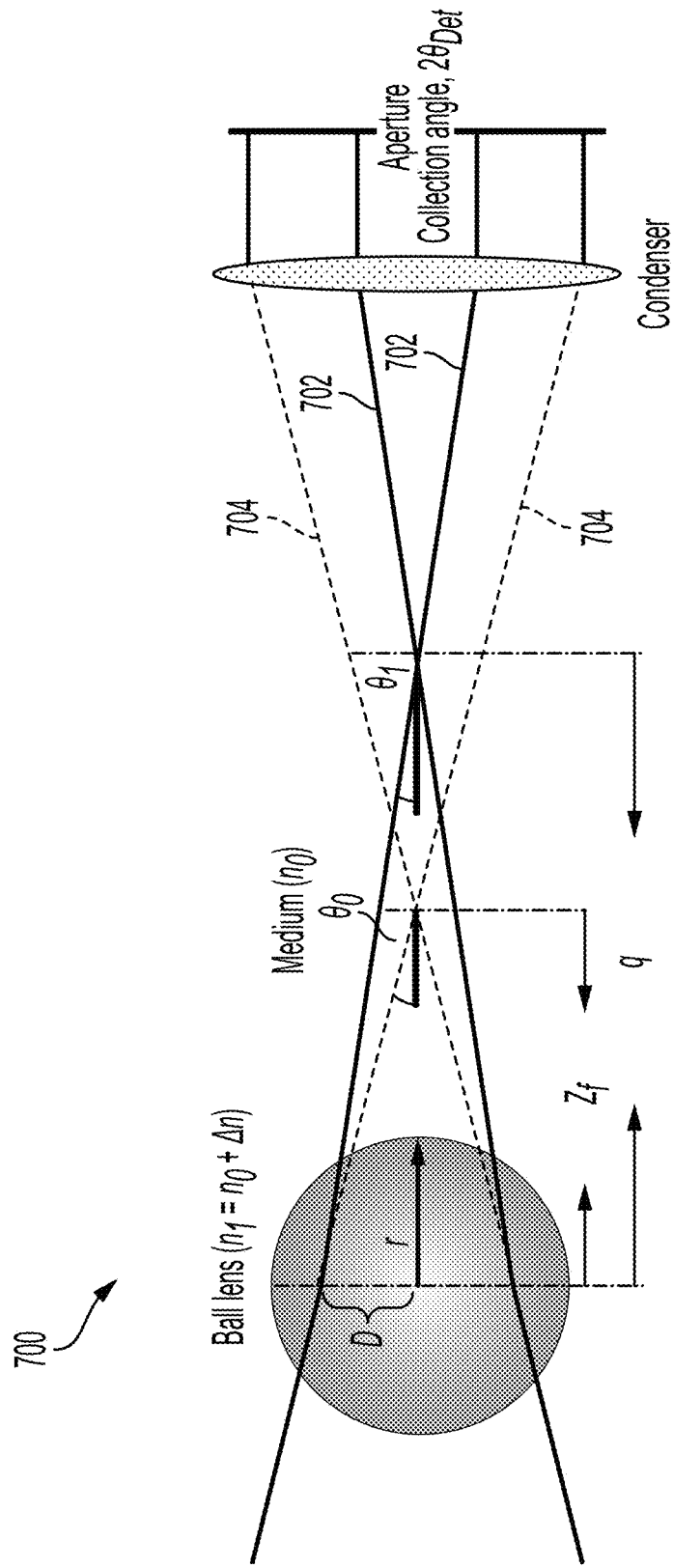
FIG. 7 is a thermal ball lens model for a detection scheme for an SRP microscope, in accordance with the subject technology.

The SRP effect can be optically sensed. The SRP effect creates a divergent lens and can be optically probed through a continuous wave beam. Referring to FIG. 7, we built a thermal ball lens model 700 to illustrate this detection scheme. Solid line 702 indicates the propagation in the absence of a ball lens. The dashed line 704 indicates the propagation of the probe laser in the presence of a ball lens. An is the change of refractive index induced by the SRP effect. In this model 700, we assumed that SRS excitation creates uniform heating in a spherical symmetric region. A thermal ball lens changes the subsequent probe light propagation, which is formulated based on geometrical optics. Under the paraxial approximation, the model 700 gives the proportionality of SRP signal intensity ($I_{SRP}$) induced by a single pair of pump and Stokes pulses as:

$$I_{SRP} \propto N_{mol} \sigma_{SRS} \phi_{pump} \phi_{Stokes} \tau_{exc} \cdot \hbar \omega_{SRS} \cdot \frac{1}{V_{SRS}} \frac{1}{C_p n_0} \frac{dn}{dT} \quad (2)$$

Here, SRS is modeled as a two-photon vibrational excitation process. The first term ($N_{mol}\sigma_{SRS}\phi_{pump}\phi_{Stokes}\tau_{exc}$) describes the number of SRS events, i.e. the number of vibrational excitations, $N_{mol}$ is the number of molecules in the excitation volume, $\sigma_{SRS}$ is the SRS cross section (in cm$^4$·s·photon$^{-1}$), $\phi_{pump}$ and $\phi_{Stokes}$ are the photon flux of the pump and Stokes lasers, respectively (in photon·cm$^{-2}$·s$^{-1}$), and $\tau_{exc}$ is the laser pulse width (in s). The second term ($\hbar\omega_{SRS}$) is the energy of vibrational transition. The last term describes properties of the measurement environment, where $V_{SRS}$ is the SRS excitation volume, $C_p$ is the heat capacity, $no_0$ is the refractive index, and dn/dT is the thermo-optic coefficient. The product of the first and the second term gives the amount of energy deposition. The last term gives the rate of heat to refractive index conversion. This term is inversely proportional to the excitation volume and the heat capacity, and is linear to the thermo-optic coefficient. The environment properties term holds potential to improve the signal intensity, which is not applicable to SRS measurement. For the high NA condition, we carried out a finite-difference time-domain wave propagation simulation. The results indicate that the SRP signal maintains linearity to concentration.

Referring now to FIGS. 2a-2d, an experimental setup of an SRP microscope is shown generally at 200 (FIG. 2a), as well as characterizations of SRP modulation depth as a function of duty cycle and modulation frequency. Graph 240 (FIG. 2b) shows measured SRP signal 242 as a function of modulation duty cycle. Graph 250 (FIG. 2c) shows measured SRP signal 252 as a function of modulation frequency. Graph 260 (FIG. 2d) shows on-resonance (262) and off-resonance (264) traces obtained with the Raman shift at 2913 cm$^{-1}$ and 2850 cm$^{-1}$, respectively, showing SRP generated a large (22.3%) modulation depth with DMSO as the sample.

Figure 2A:
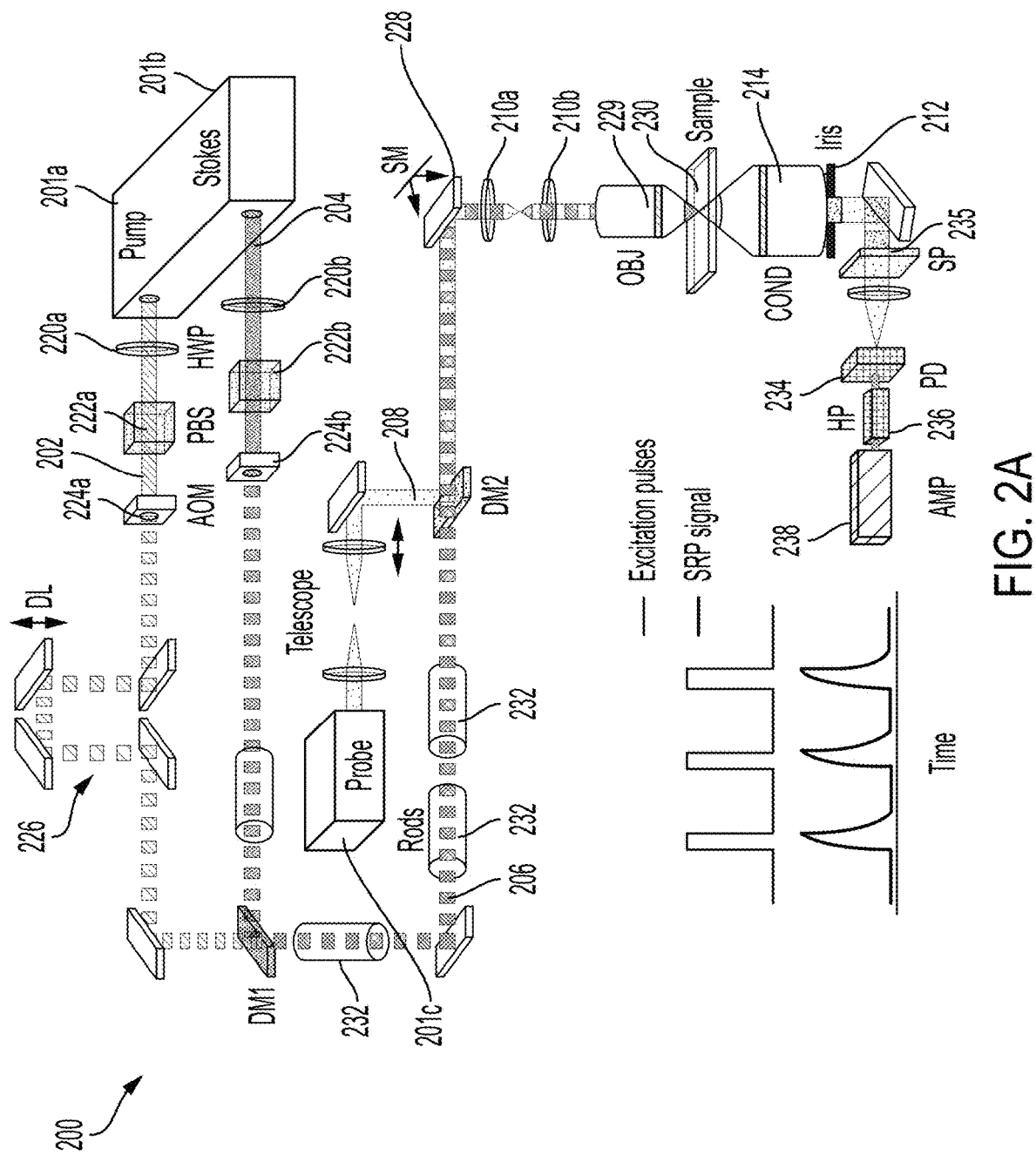
FIG. 2a is a schematic of an SRP microscope in accordance with the subject technology.
Figure 2B:
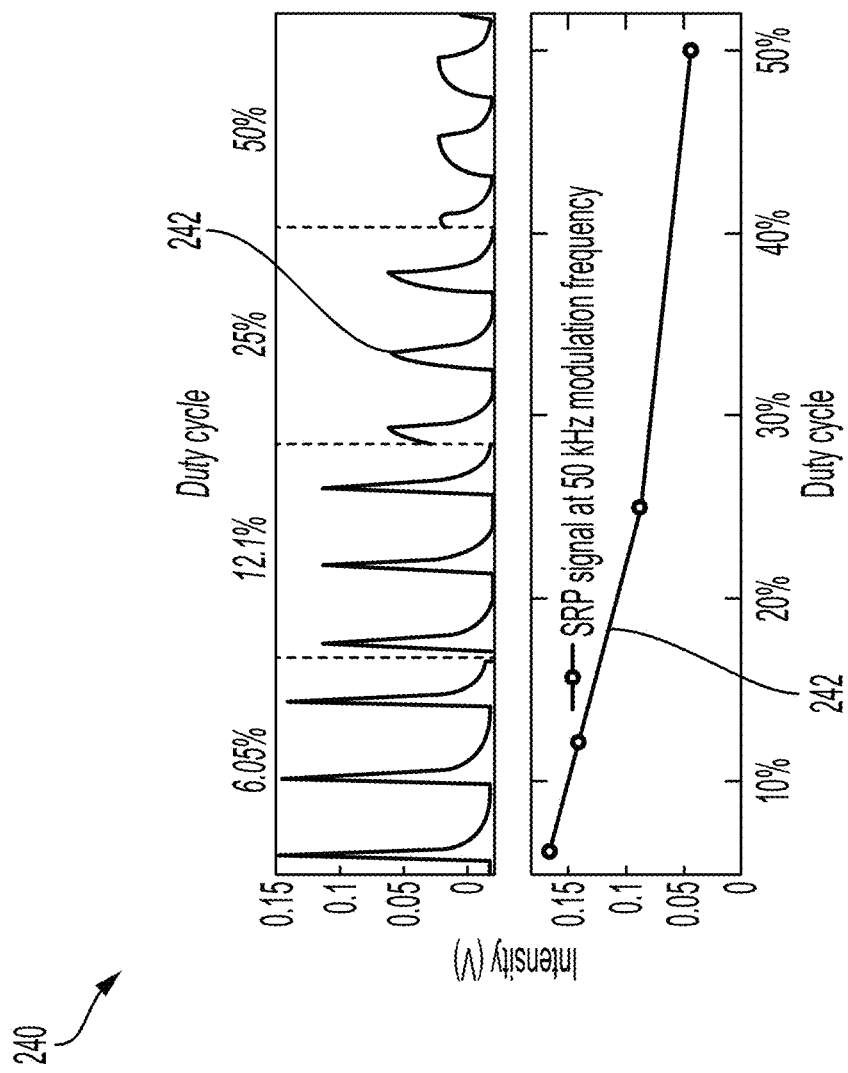
Figure 2C:
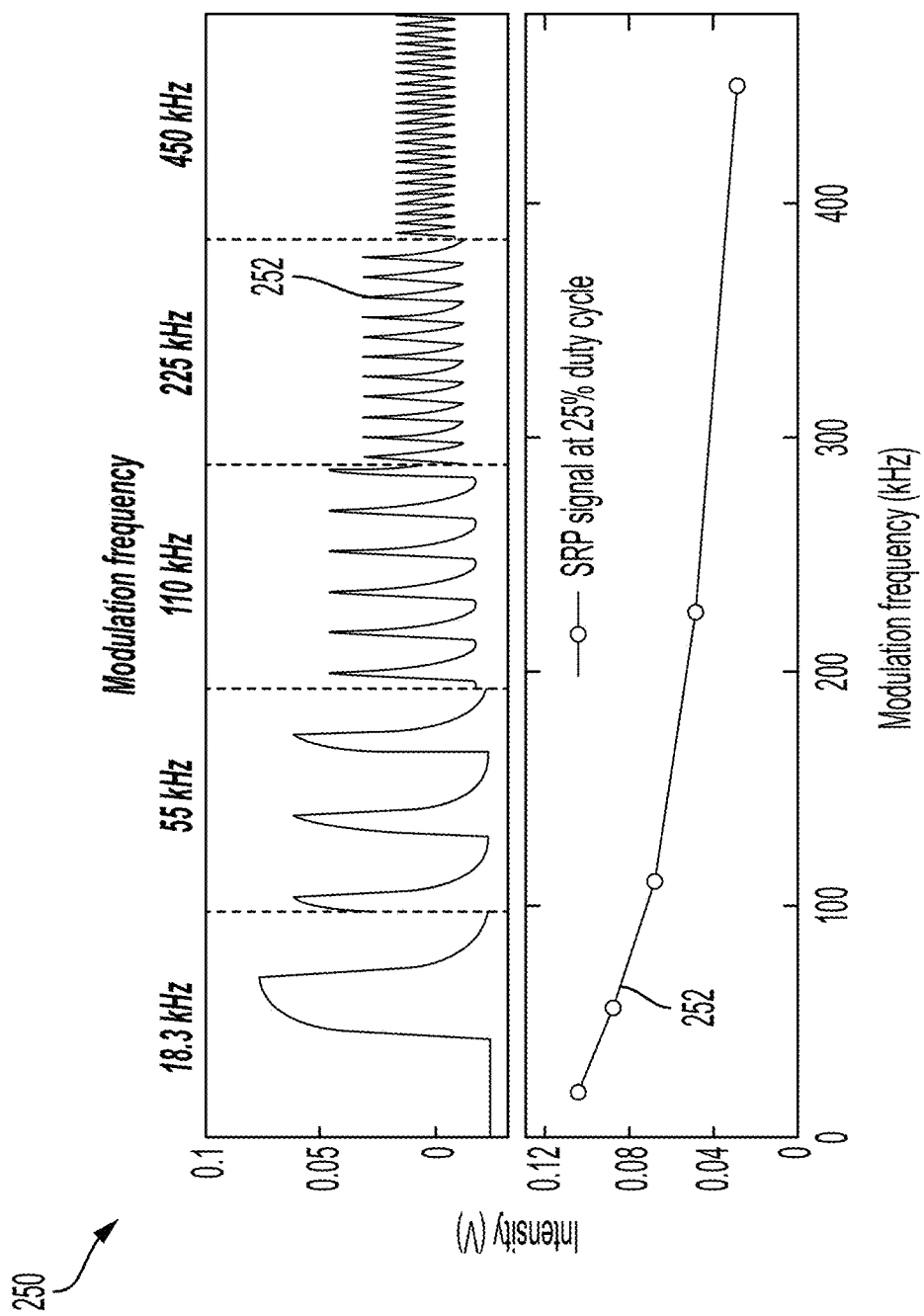

In general, FIG. 2a shows an experimental setup of the SRP microscope 200. The microscope 200 includes optical sources including lasers 201a, 201b, emitting a pump beam 202 and a Stokes beam 204. An additional optical source in laser 201c provides a probe beam 208. The system includes dichroic mirrors 216a, 216b which direct the lasers and facilitate combining of the pump and Stokes beams 202, 204 into a combined pump beam 206, while also allowing the pump beam 206 to be collinearly aligned with the probe beam 208. The pump beam 202 travels through a half-wave plate 220, a polarizing beam splitter 222, an acousto-optic modulator 224, and a delay line 226. The Stokes beam 204 travels through a half-wave plate 220b, a polarizing beam splitter 222b, and an acousto-optic modulator 224b before combining with the pump beam 202. The combined pump beam 206 and probe beam 208 pump beam travel are directed colinearly toward the sample 230 (i.e. along a shared optical path) and are scanned by scanning mirror 228 before traveling through lenses 210a, 210b, objective 229, and then reaching the sample 230.

The SRP microscope 200 senses the local refractive index modulation using the third continuous wave beam 208. The synchronized pump and Stokes pulse trains 202, 204 are intensity-modulated by the two acousto-optic modulators (AOM, 204a, 204b), combined, and chirped by glass rods 232. Here, chirping of femtosecond pulses generates spectral focusing for excitation of specific Raman modes. The probe beam 208 is collinearly aligned, along a shared optical path, with the SRS beams 202, 204. The pair of lenses 210a, 210b adjusts the collimation of the probe beam 208 to make the probe laser 201c focus axially off the SRS focus, thereby maximizing the photothermal signal. An iris 212 at the back focal plane of the condenser lens 214 is set to an NA of 0.4 to convert the probe beam refraction modulation to intensity modulation. An optical detector 234 (e.g. a fast photodiode 234) detects the probe beam intensity after passing through a spectral filter 235. The detected signal is then provided to a highpass filter 236 and a broadband amplifier 238. The SRP modulation induced by synchronized pump and Stokes pulses is digitized in real time by a high-speed digitization card.

It should be understood, that other typical optical components (e.g. lenses, mirrors) and/or electrical components (power supplies, amplifiers, processing equipment) may be included to allow the microscope 200 to function as described herein. Further, the various components of the microscope 200 can be implemented using different components than those particularly shown and described, as would be understood by one of skill in the art.

Unlike SRS, both the pump and Stokes beams 202, 204 are intensity-modulated in the SRP microscope 200. SRS intensity is proportional to the product of the pump and Stokes peak power. With conserved average laser power, reduction of laser duty cycle leads to higher laser peak power, and hence more SRS energy deposition. As shown in the graph 240 of FIG. 2b, our results confirmed this and showed much higher SRP signal intensity (graph line 242) with a lower duty cycle. In SRP imaging applications, the duty cycle was set to 5~10% as a compromise between signal intensity and laser power. Notably, match filtering can be applied to the low duty cycle SRP signal to further improve the SNR. Another key parameter is the modulation frequency. As shown in the graph 250 of FIG. 2c, lower frequency shows higher signal intensity (graph line 252) due to longer heat accumulation time but suffers more from the 1/f laser intensity noise. However, it also reduces the imaging speed and compromises the spatial resolution. 125 kHz was chosen to balance these factors.

Figure 2D:
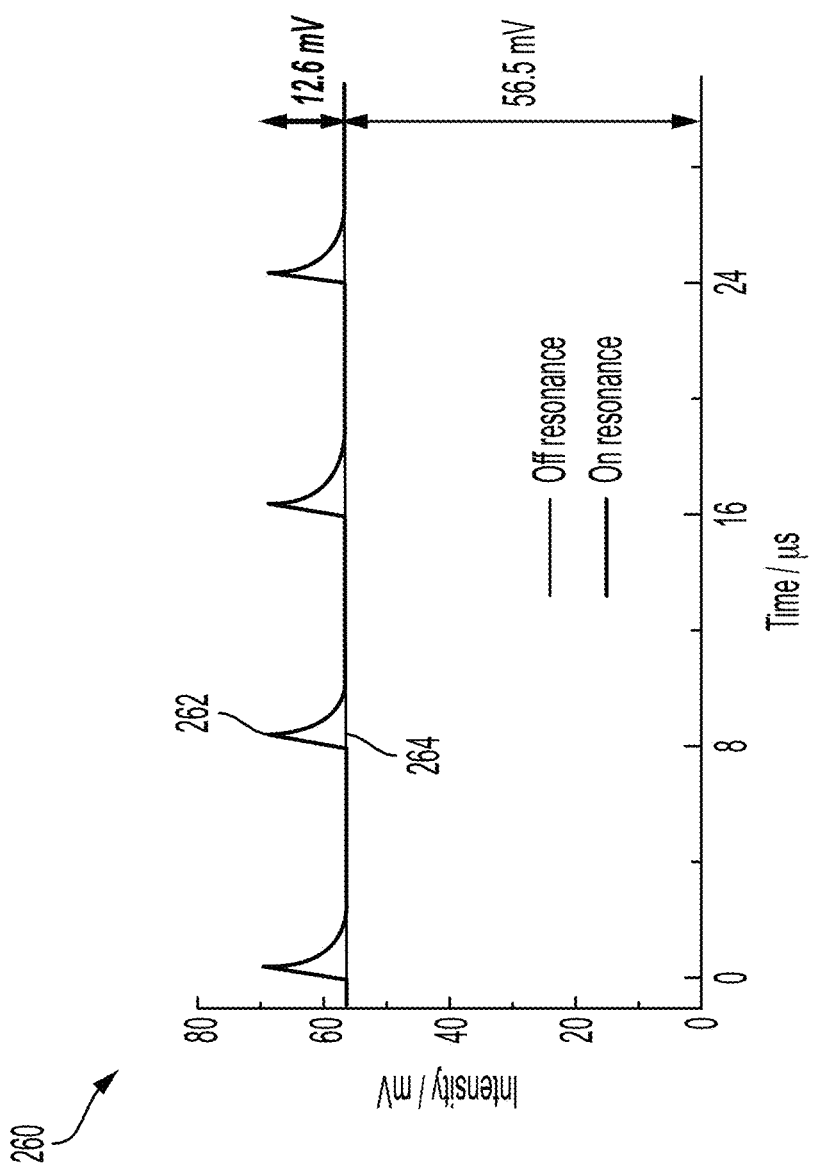

For a pure liquid, under conditions of a 5% duty cycle and 125 kHz modulation frequency, the induced modulation on the probe beam 208 was so strong that we could directly measure the SRP signal in the direct current channel without any amplification (graph 260 of FIG. 2d). With reasonable laser powers on the sample 230 to excite the C—H symmetric stretching mode (2913 cm$^{-1}$) of DMSO, the modulation depth reached 22.3%. This is >500-fold higher than the SRS modulation depth (0.04%) with identical average power. The tremendously higher modulation depth lays the foundation for a better detection sensitivity.

In addition to duty cycle and modulation frequency, the thermal ball lens model 700 (FIG. 7) shows that the medium properties are another crucial factor that affects the photothermal signal intensity. The photothermal signal intensity (S), thermo-optic coefficient (dn/dT) and heat capacity ($C_p$) have a relationship that $$S \propto \left(\frac{dn}{dT}/C_p\right),$$

which is also supported by previous literature. Yet, the most common medium in biological samples, water, has a low thermo-optic coefficient ($-1.13 \times 10^{-4}$ K$^{-1}$) and high heat capacity (4181 J·kg$^{-1}$·K$^{-1}$). Seeking to increase the signal intensity, we investigated common liquid media, as shown in table 800 of FIG. 8. We found glycerol augments the signal intensity by 3.21-fold compared to water. Glycerol also shows high biocompatibility and is widely used as a mounting medium or clearing agent in bio-imaging. We conducted a simulation of the thermal lens comparison, which also aligns with previous theories. It indicates the peak refractive index change in a glycerol medium is ~2.5-fold higher than in water when subjected to an identical heating, which in this case is a 100 nm poly(methyl methacrylate) (PMMA) nanoparticle under on-resonance SRP heating. Therefore, glycerol was chosen as the medium to push the sensitivity limit of SRP imaging. Considering the inherent Raman-active vibrational features of glycerol, deuterated glycerol (glycerol-d8) was applied for SRP measurement at the C—H and fingerprint regions.

Figure 3A:
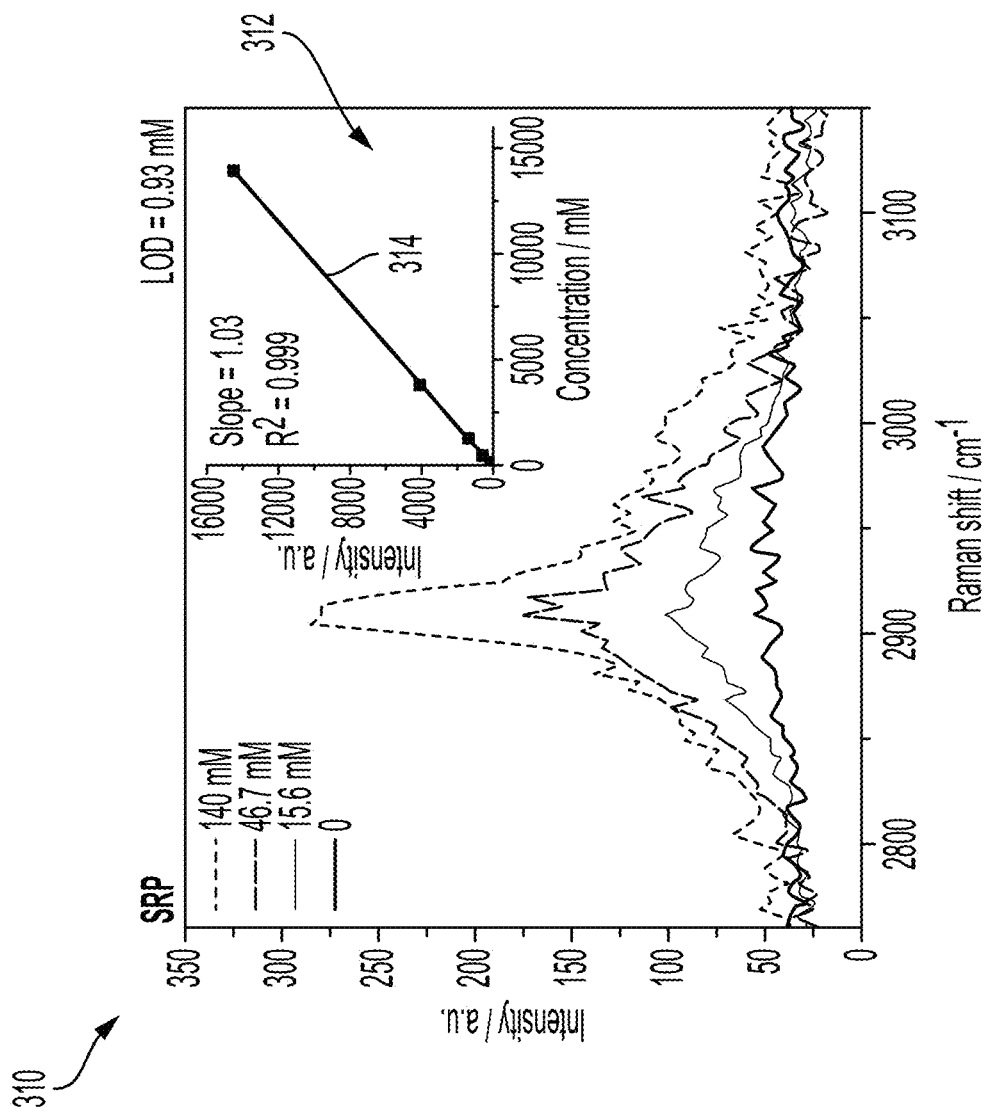
FIG. 3a is a graph of SRP obtained with a microscope in accordance with the subject technology.
Figure 3B:
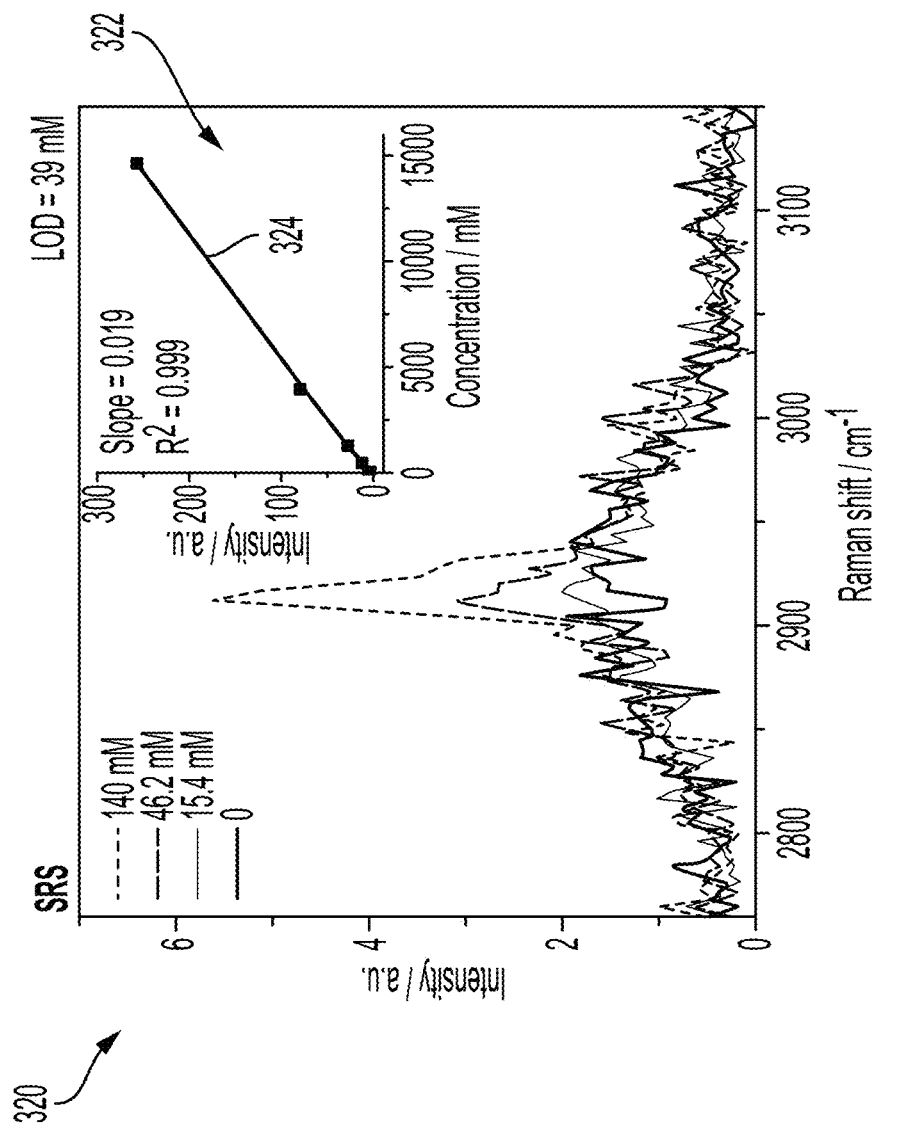
FIG. 3b is a graph of SRS obtained with a microscope in accordance with the subject technology.
Figure 3C:
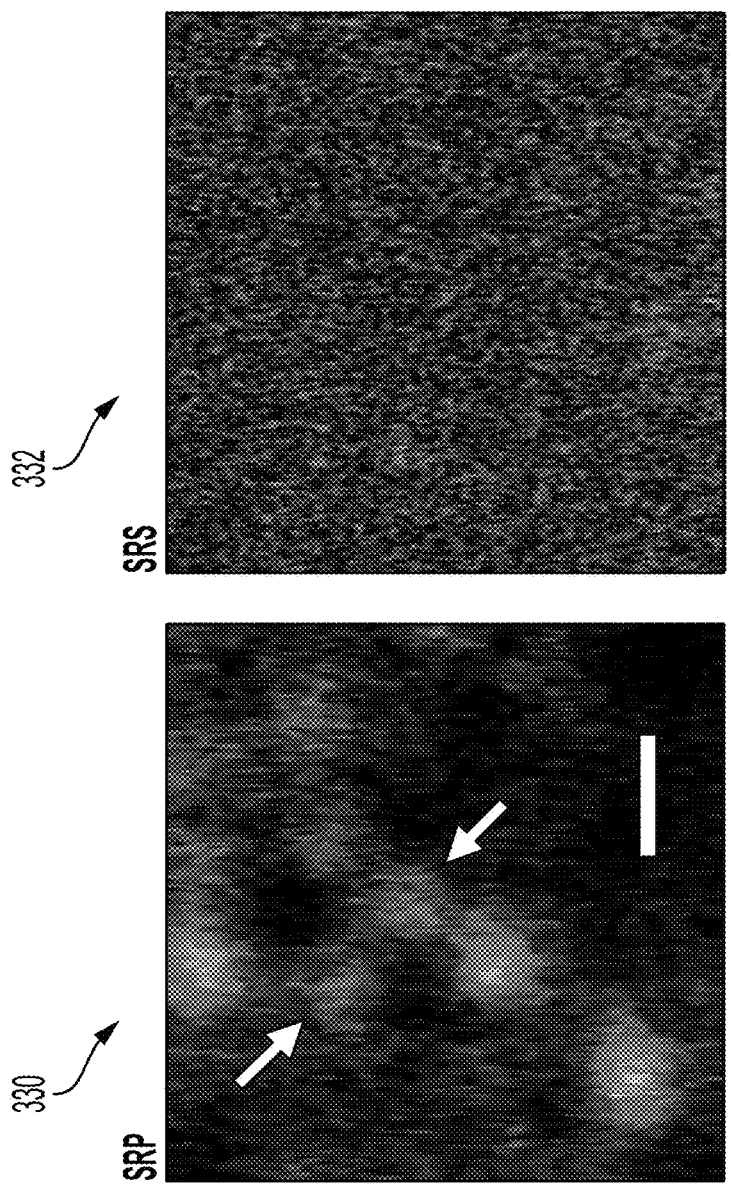
FIG. 3c shows SRP and SRS images obtained with a microscope in accordance with the subject technology.
Figure 3D:
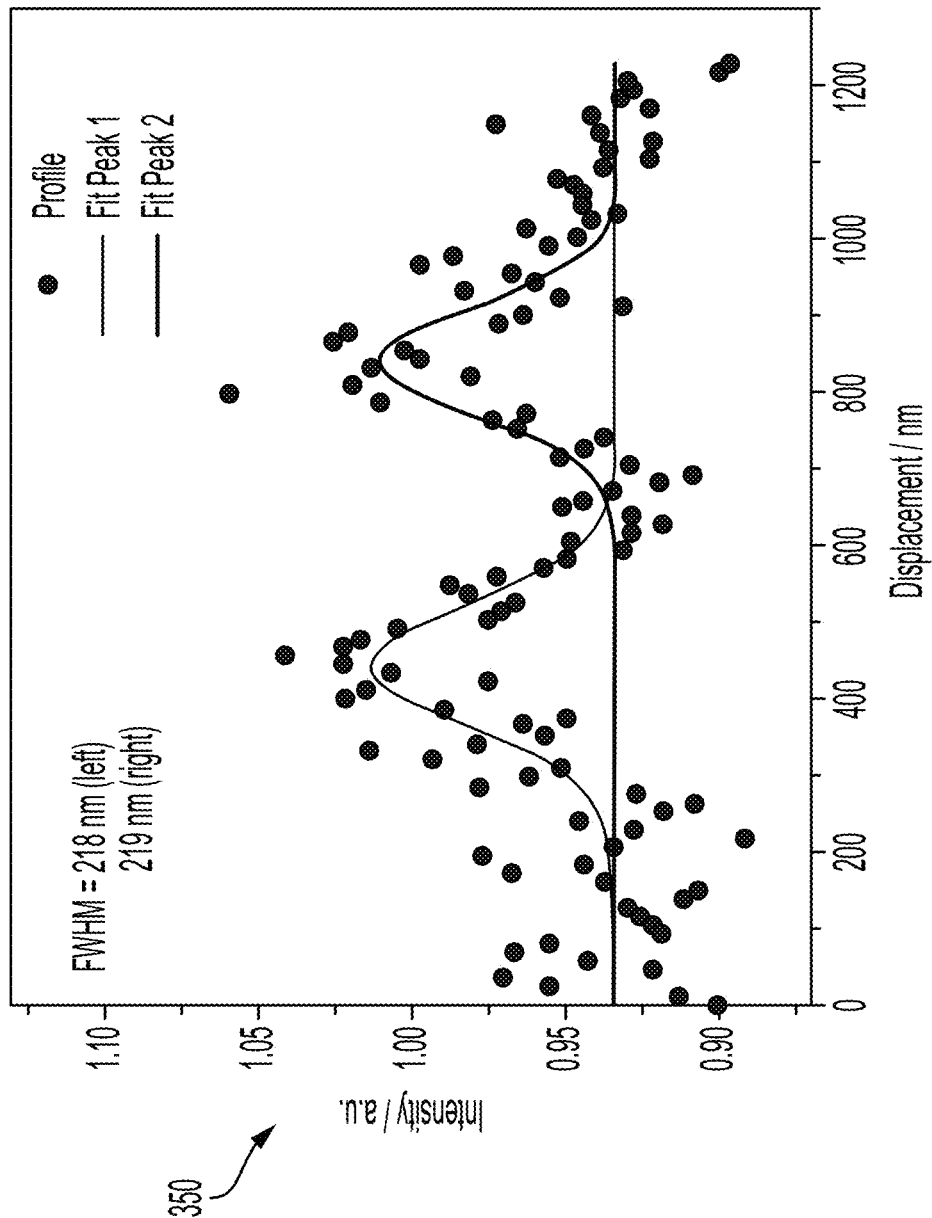
FIG. 3d is a graph of the Gaussian fitting full width at half maximum (FWHM) of a bead profile, obtained with a microscope in accordance with the subject technology.

Referring now to FIGS. 3a-3d, SRP spectroscopy and imaging performance characterizations are shown. Graphs 310, 320 show SRP signals and SRS signals, respectively, with gradient concentrations of DMSO dissolved in DMSO-d6. Each contain an insert 312, 322, respectively) which shows the signal intensity (314, 324, respectively) as a function of concentration. FIG. 3c shows an SRP image 330 and an SRS image 332 of 100 nm PMMA beads at 2950 cm$^{-1}$ with the same average power, at the same field of view (Scale bar: 500 nm). The beads were immersed in d8-glycerol. FIG. 3d is a graph of the Gaussian fitting FWHM of bead profile (218 nm).

We first characterized the spectral fidelity of our SRP microscope with well-defined samples. The SRP spectra agreed with the SRS spectra for both the bulk liquid sample and nanoparticles (PMMA). The SRP intensity is also proportional to $\omega_{SRS}$, while its impact on the SRP spectrum is negligible in a narrow spectral window. The high spectral fidelity builds the foundation to further compare the detection sensitivities of both techniques.

We then measured the limit of detection (LOD) for DMSO, focusing on the 2913 cm$^{-1}$ mode. To keep the thermal and optical properties constant throughout the measurement, deuterated DMSO (DMSO-d6) was used as the solvent to dilute DMSO. As shown in FIG. 3a, the SRP spectrum was clean and smooth with a high concentration DMSO sample, and the signal was observable at a concentration as low as 5.1 mM. We calculated the LOD as 2.3 mM using LOD=3σ/k, where σ is the standard deviation of the baseline and k is the slope of the intensity-concentration linear calibration curve. In comparison, the LOD by SRS under identical average laser powers was found to be 39 mM. Thus, SRP measurement offers a ~17-fold improvement. The LODs for C≡C and C-D bonds were measured in DMSO media using 1,7-Octadiyne and DMSO-d6. In both cases, SRP showed superior sensitivity to SRS, with 12-fold LOD increase on 1,7-Octadiyne and 4-fold LOD increase on DMSO-d6.

Such sensitivity improvement allows high-quality imaging of nanoparticles. With the SRP microscope 200, we successfully acquired a hyperspectral image of 100 nm PMMA beads (FIG. 3c). The acquired SRP spectrum showed a Raman peak of PMMA at 2950 cm$^{-1}$ which was well-distinguished from the background spectrum, with an SNR ~7.0 after BM4D denoising. In comparison, the SRS measurement showed no contrast of 100 nm beads on the same sample with identical average laser power. Collectively, SRP showed improved sensitivity compared with SRS, both for liquid samples and for nanoparticles. Importantly, the introduction of a third probe beam at a shorter wavelength helped improve the spatial resolution. As seen in FIG. 3d, we plotted the intensity profile across a pair of 100 nm PMMA beads, with the Gaussian-fitted FWHM found to be ~218 nm. Deconvolution with the size of the beads generated an FWHM of ~194 nm, which was below the theoretical resolution limit of SRS under the same condition (~217 nm, FWHM of the Airy disk).

Referring now to FIGS. 4a-4l, various images and graphs related to SRP imaging of biological samples in aqueous environments are shown, in accordance with the systems and methods disclosed herein. To explore the potential of SRP in bio-imaging, we first performed label-free SRP imaging of live SJSA-1 osteosarcoma cancer cells. As shown in image 400 of FIG. 4a, the lipid droplets, endoplasmic reticulum (ER) and nucleolus show a strong signal at 2930 cm$^{-1}$. The nuclear membrane shows pronounced contrast, indicating locally enhanced photothermal intensity in an aqueous environment. At an imaging speed of ~2.8 s/frame, the dynamics of lipid droplets were captured, with all trajectories displayed in image 406 of FIG. 4b.

Next, we performed hyperspectral SRP imaging of SJSA-1 cells at the C—H stretching vibration region. As demonstrated in image 412 of FIG. 4c, subcellular structures, such as lipid droplets and nucleolus show decent contrast. Subsequent phasor analysis was applied to segment the subcellular structures, where five of the major components were identified (image 418 of FIG. 4d) with corresponding spectra.

To explore the applicability of SRP imaging in the silent window, we studied the cellular uptake of deuterated palmitic acid (PA-d31). We generated hyperspectral SRP images of SJSA-1 cells incubated with PA-d31. With phasor analysis, the PA-d31 rich regions (the membrane and ER) can be well separated from other cellular components (image 424 of FIG. 4e). The spectral profile (graph 430 of FIG. 4f) from phasor analysis shows a peak at 2100 cm$^{-1}$, where the C-D stretch vibration resides. In the control sample without PA-d31 treatment, only the cellular components were observed (image 436 of FIG. 4g and graph 442 of FIG. 4h). It is worth noting that the background signal is independent of Raman shift. This background is likely from the overtone absorption of C—H vibrational transitions, which also deposits energy and create photothermal contrast. The cell background in the C-D SRP images is stronger than that in the C—H SRP images (FIG. 4d), which can be attributed to the 855 nm pump laser used for C-D excitation being close to the 920 nm overtone absorption band of the C—H stretching vibration.

Figure 4B:
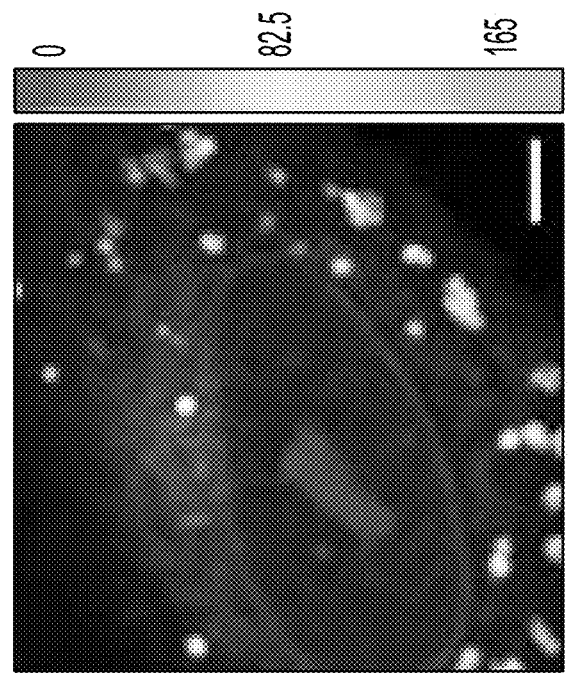
Figure 4A:
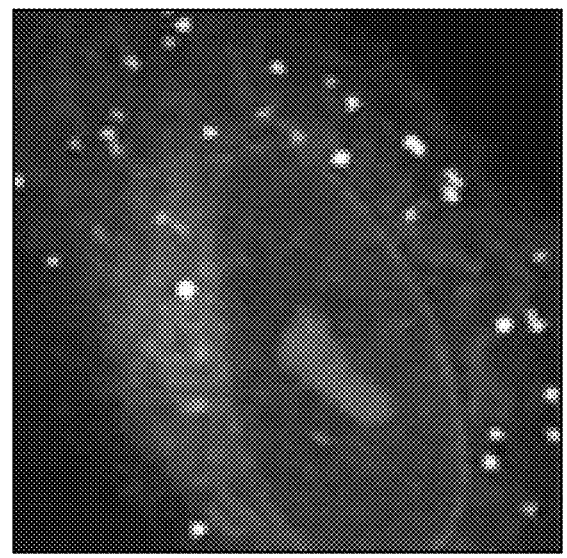
FIG. 4a is an SRP image of a live SJSA-1 cell in PBS, in accordance with the subject technology.
Figure 4D:
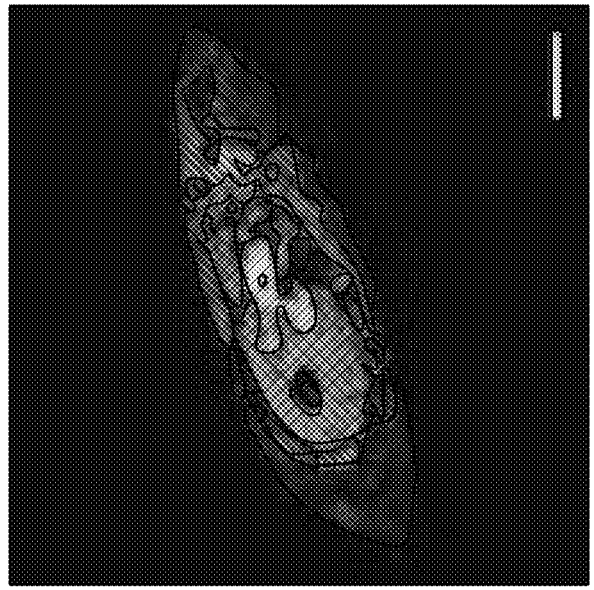
FIG. 4d is a phasor analysis output of the hyperspectral SRP image of FIG. 4c.
Figure 4C:
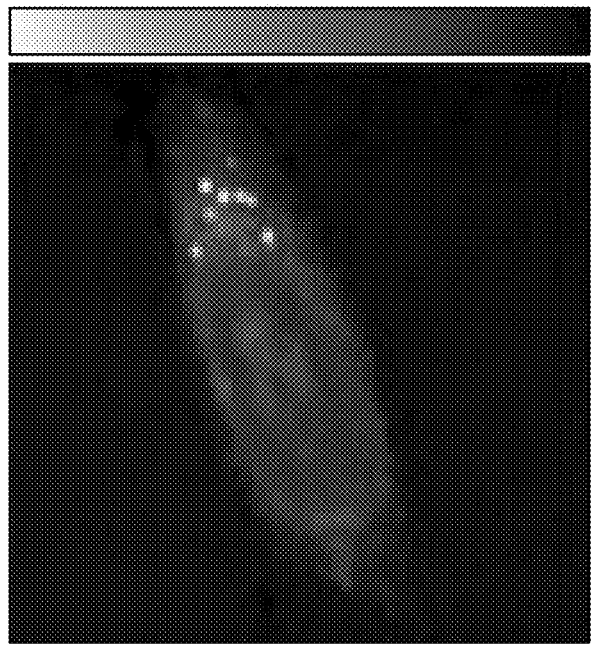
FIG. 4c is a hyperspectral SRP image of fixed SJSA-1 cell in PBS, 2930 cmi, in accordance with the subject technology.
Figure 4F:
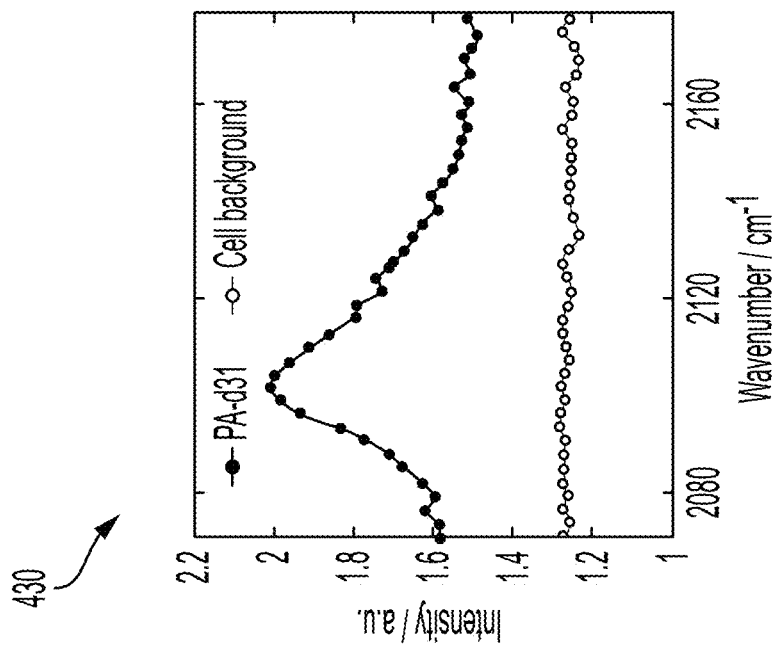
FIGS. 4e, 4f are an image and graph, respectively, of SRP analysis of a SJSA-1 cell in PBS with palmitic acid-d31 (PA-d31) treatment, in accordance with the subject technology.
Figure 4E:
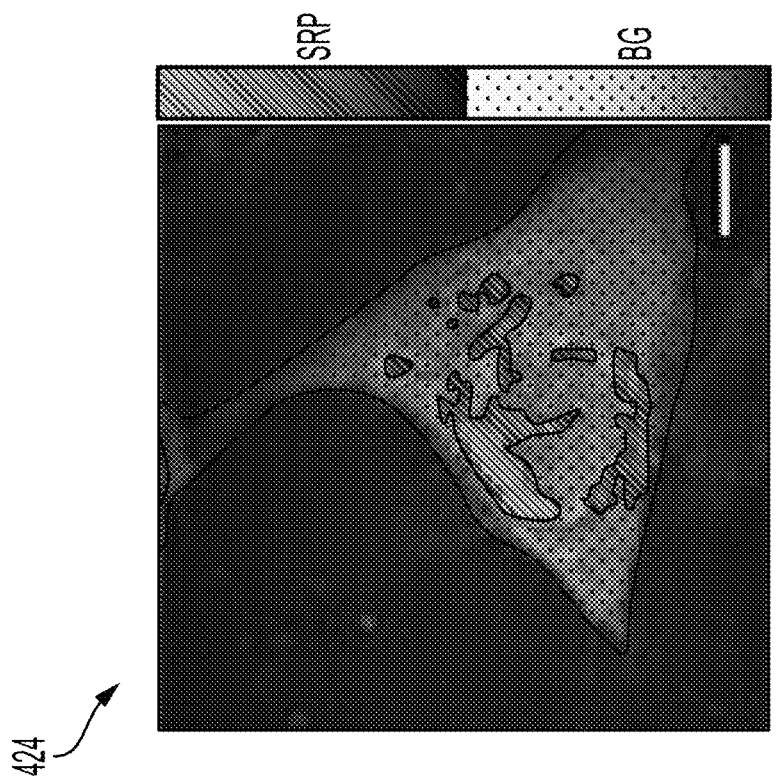
Figures 4G, 4H:
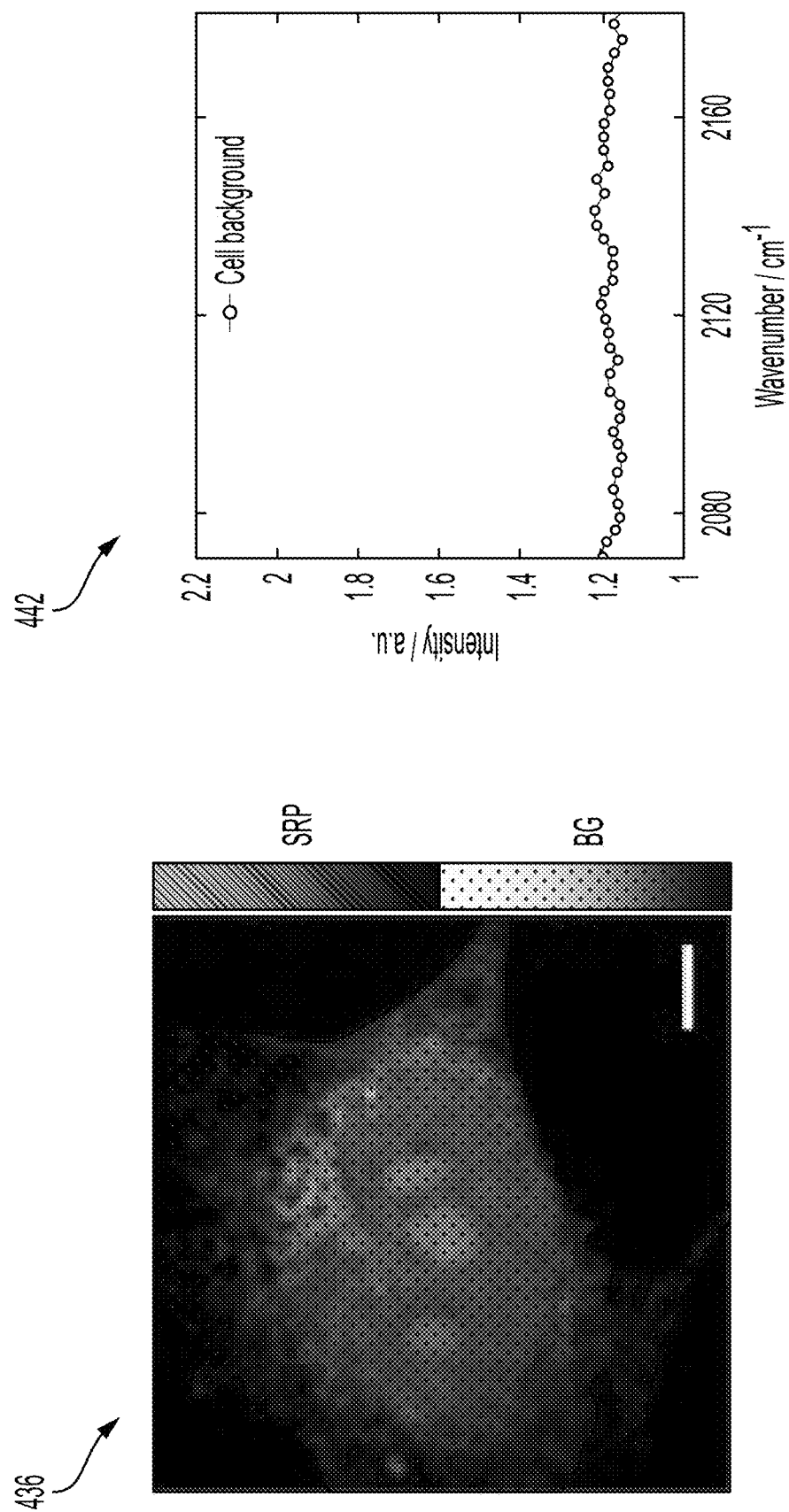
FIGS. 4g, 4h are an image and graph, respectively, of SRP analysis of a SJSA-1 cell in PBS without palmitic acid-d31 (PA-d31) treatment, in accordance with the subject technology.
Figure 4J:
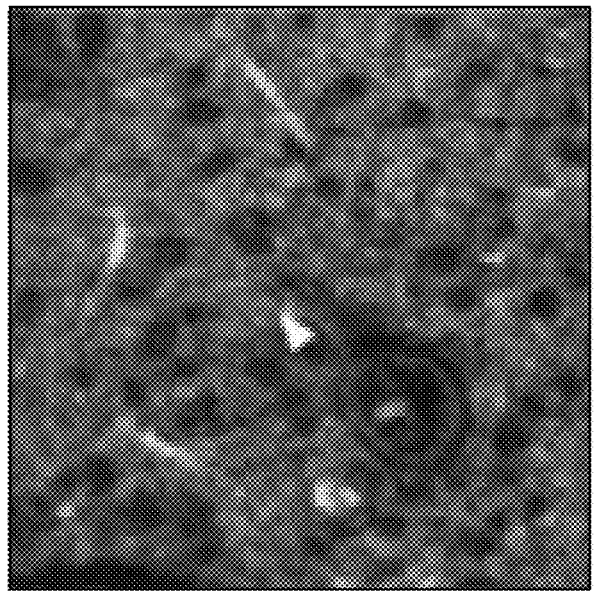
FIGS. 4i-4k are SRP images of a mouse brain immersed in PBS at 2930 cm$^{-1}$ in different regions, in accordance with the subject technology.
Figure 4I:
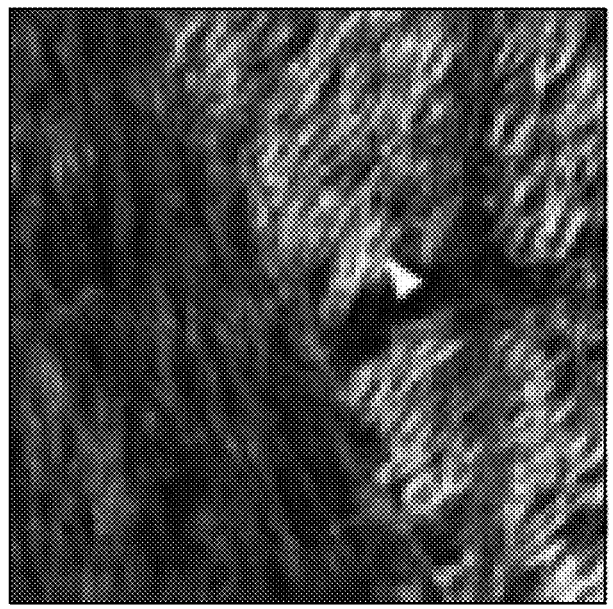
Figure 4L:
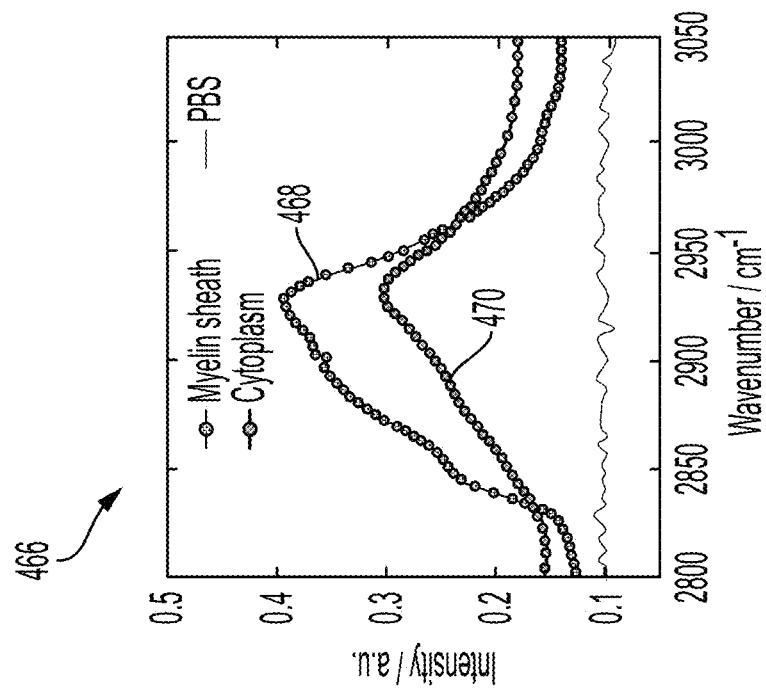
FIG. 4l is a graph of representative spectra in the mouse brain of FIGS. 4i-4k, obtained with a microscope in accordance with the subject technology.
Figure 4K:
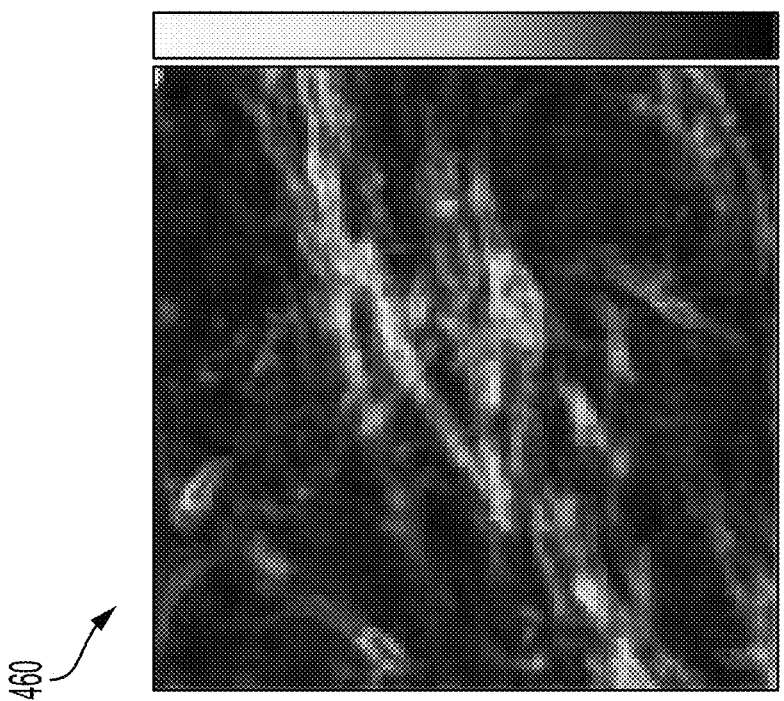

Using mouse brain slices as the sample, we proceeded to evaluate SRP imaging performance on tissue specimens, as shown in images 448, 454, 460 of FIGS. 4i-4k. Three field-of-view (FOVs) are chosen as representations of typical brain structure. The detailed structure of myelin sheath can be clearly resolved, showing the typical lipid-rich Raman spectral features. The myelin sheaths with different orientations show drastically different signal intensities, indicating a strong dependence of the SRP intensity on the laser polarization. In image 454, densely packed cytoplasmic organelles were observed. The SRP spectra (graph 466 of FIG. 4l) show the lipid peak at 2845 cm$^{-1}$ and the protein peak at 2930 cm$^{-1}$ for myelin sheath (468), while the cytoplasm signal (470) is dominated by proteins. The SRP signal from the medium is weak and independent of Raman shift. Collectively, our data show the potential of SRP imaging in chemical analysis of tissues with good spectral fidelity.

Referring now to FIGS. 5a-5f, SRP imaging of biological samples immersed in glycerol are shown, along with spectrum graphs of the same. Compared to water, the high thermo-optic coefficient and low heat capacity of glycerol open up the opportunity to further boost the sensitivity of SRP microscopy. Inspired by the capability of imaging 100-nm nanoparticles with high SRP contrast (FIG. 3c), we first assessed SRP imaging of viral particles. As shown in image 510 of FIG. 5a, individual varicella-zoster viral particles (diameter≈180 nm) could be clearly resolved from the background with an SNR of ~20. The SRP spectrum of a single virus (graph line 520 of FIG. 5b) peaked at 2950 cm$^{-1}$, indicating a strong contribution from the nucleic acids at the core of the virus.

Glycerol-d8 as a mounting medium was used to improve the quality of SRP imaging of mammalian cells. We used the pancreatic cancer cell MIA PaCa-2 as the testbed (shown in image 530 of FIG. 5c). Glycerol-d8 was applied to replace the PBS buffer and immerse the cells to enhance the SRP contrast. SRP imaging at the high-wavenumber C—H vibration region showed a large contrast from membranes and intracellular lipids. Phasor analysis was applied to segment the cellular compartments, where up to six different components could be well identified (as shown in image 540 of FIG. 5d). Notably, the nuclear membrane 542 stood out from the cytoplasm 544 and the nuclear matrix 546, highlighting the potential of applying SRP to study fine membrane structures. It is likely that this high contrast is a result of the high thermo-optic coefficients and low heat capacities of membranes.

Figure 5C:
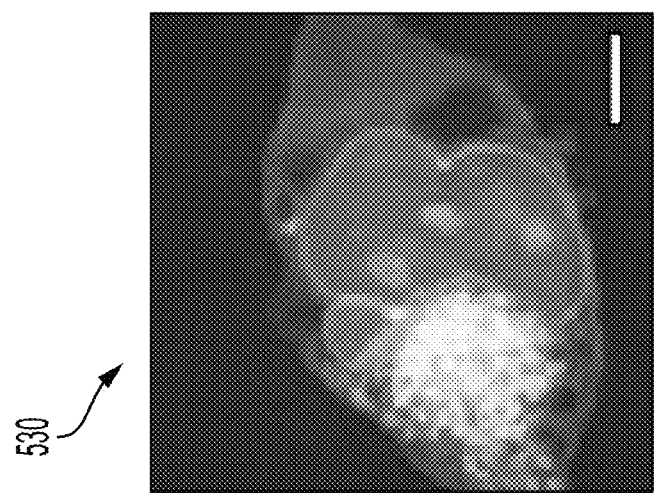
FIG. 5c is an SRP image of a fixed Mia PaCa-2 cell immersed in glycerol-d8, at 2950 cm$^{-1}$, obtained with a microscope in accordance with the subject technology.
Figure 5B:
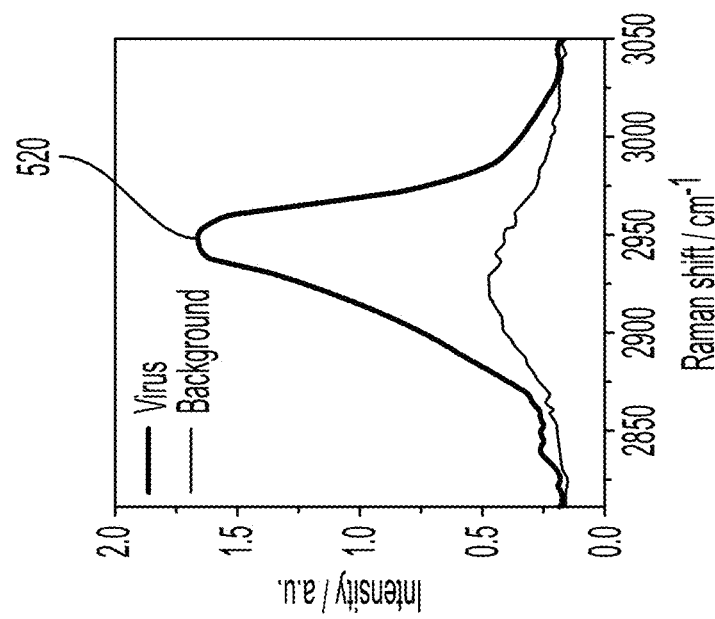
Figure 5A:
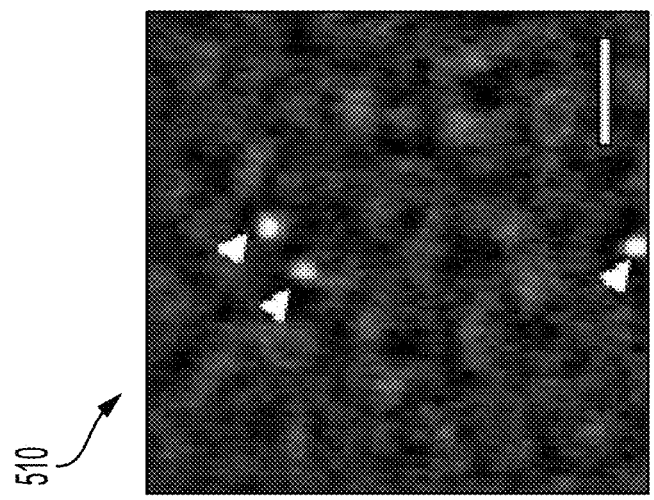
FIG. 5a is an SRP image of a single varicella-zoster virus immersed in glycerol-d8, 2950 cm$^{-1}$, obtained with a microscope in accordance with the subject technology.
Figures 5D, 5E, 5F:
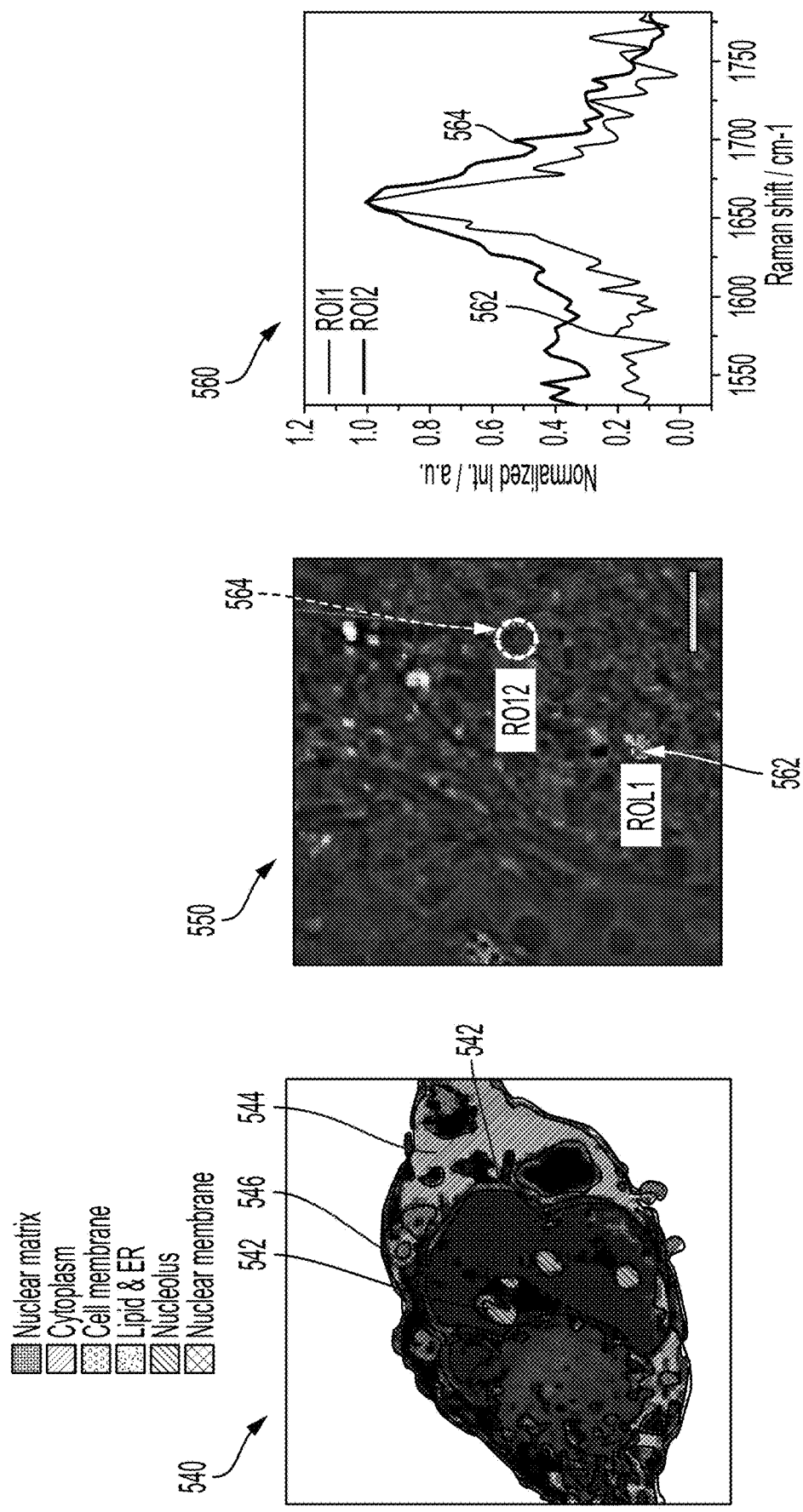
FIG. 5d is a chemical map from phasor analysis of the image of FIG. 5c.
FIG. 5e is an SRP spectroscopic image of OVCAR-5 tissue, cleared with glycerol-d8, at 1650 cm$^{-1}$, obtained with a microscope in accordance with the subject technology.
FIG. 5f is a graph of single pixel spectrum, obtained from identified regions of interests (ROI) from FIG. 5e.

Upon addition of glycerol, the high sensitivity of SRP also provides access to weak Raman bands in the fingerprint region. FIG. 5e shows the SRP image 550 of a 10 μm thick OVCAR-5 cancer tissue at 1650 cm$^{-1}$ that targets the Amide I band in proteins and the C=C vibration in lipids. High-quality spectra were resolved from the hyperspectral image stack. In graph 560 of FIG. 5f, the lipid (region of interest 1 (ROI 1), graph line 562) and protein (ROI 2, graph line 564) species are clearly differentiated.

Finally, we conducted a direct comparison between SRP and SRS at the same FOV on a SKOV3 cell in glycerol, with conserved average laser power and dwell time. The representative cellular structures (lipid droplets, cell nuclei, and nucleolus) could be clearly resolved in the images obtained. Comparison between profiles showed an SNR of 53 for SRP and 17 for SRS. Furthermore, the SRP image showed sharper contrast for the intranuclear structures.

Thus, as discussed herein, in this work we have numerically simulated and experimentally confirmed the presence of the SRP effect. Based on this SRP effect, we have built an SRP microscope and demonstrated superior detection sensitivity and resolution in comparison to a conventional SRS microscope. We have also demonstrated SRP imaging of multiple biological samples in aqueous and glycerol environments. Below, we compare SRP and SRS in terms of detection mechanism, spatial resolution, laser noise, and solvent effect.

SRS microscopy measures either the gain in Stokes or the loss in the pump beam. Thus, a high-NA objective is needed to maximize the collection efficiency while minimizing the cross-phase modulation. In contrast, SRP microscopy measures light scattering caused by thermal expansion of a particle or refraction caused by the thermal lens. Thus, SRP favors light collection with a low-NA objective or an air condenser. Our results show that with a 0.5 NA air condenser, the SRP image is clear and sharp, while the SRS image is comparably noisier. Also, SRP maintains good spectral fidelity, while SRS spectrum has been distorted by the enhanced cross-phase modulation background. Quantitatively, the SRP image we obtained shows 21.2-fold SNR improvement and 7.8-fold signal-to-background ratio (SBR) improvement when compared to the SRS image. The relaxation of the high NA oil condenser requirement brings convenience in the SRP applications.

SRP holds slight advantage over SRS in terms of spatial resolution. With the introduction of a probe laser, the ideal effective point spread function (PSF) is the product of all three laser PSFs (i.e. pump, Stokes, and probe). In addition, the probe can be chosen at a much shorter wavelength to yield a much sharper SRP effective PSF. In this work, with a 1.49 NA objective, the ideal resolution reaches ~167 nm with a 765 nm laser applied as the probe and ~137 nm when measured with a 522 nm laser. It is worth noting that achieving such an ideal resolution improvement requires a high frequency, since thermal diffusion within a modulation period will enlarge the size of thermal lens compromising the resolution. At the extreme of low modulation frequency, the resolution is degraded to that of SRS. With the current modulation frequency of 125 kHz, the spatial resolution improvement has been substantial, from ~217 nm with SRS to ~194 nm with SRP.

The different measurement scheme between SRP and SRS also brings different origins of noise in the measurement. In both measurements, the major origin of noise is the relative intensity noise and shot noise of the measured laser beam, which is the probe laser in SRP, or the pump/Stokes laser in SRS. The different origins of noise afford SRP two advantages. First, SRP is less susceptible to the laser noise of the ultrafast lasers used for SRS excitation. Therefore, SRP can be implemented with a noisy ultrafast laser; second, both the pump and Stokes laser powers can be increased without affecting the measurement noise of SRP. Therefore, SRP potentially enables the application of noisy and high-power lasers for vibrational imaging.

A distinguishing feature of SRP compared to SRS is its dependence on the properties of the sample environment. As a result, the lipid-rich regions in the cellular images, such as lipid droplets and lipid bilayers in membranes, exhibit enhanced contrast in comparison to SRS images. This property also enables opportunities to enhance the SRP signal intensity with a carefully engineered medium, such as critical xenon, which could bring a ~400-fold enhancement as demonstrated in visible photothermal microscopy. However, it is important to note that the sample-dependent nature of SRP signals may pose a challenge to quantitative analysis in highly heterogeneous environments.

There is still space to improve the SRP imaging performance. In one example, the imaging speed can reach up to 8 us/pixel, or ~3 frames-per-second (FPS) for a 200×200-pixel image. This imaging speed is majorly limited by the low modulation frequency at 125 kHz. It is possible to achieve much higher imaging speed by measuring the SRP effect caused by a single pair of SRS excitation pulses at 1 MHz repetition rate. Under such conditions, the imaging speed is only constrained by the rate of sample cooling, usually on the level of 1 s/pixel. This would be sufficient for SRP imaging close to video rate. Regarding detection sensitivity, it is viable to incorporate a more elegant photothermal detection scheme to boost the signal intensity, such as fluorescence detection or nanomechanical photothermal sensing. Regarding spatial resolution, it is possible to switch to a shorter wavelength probe laser and couple with an imaging scanning microscopy technique to further improve the resolution to sub-100-nm level.

Figure 9:
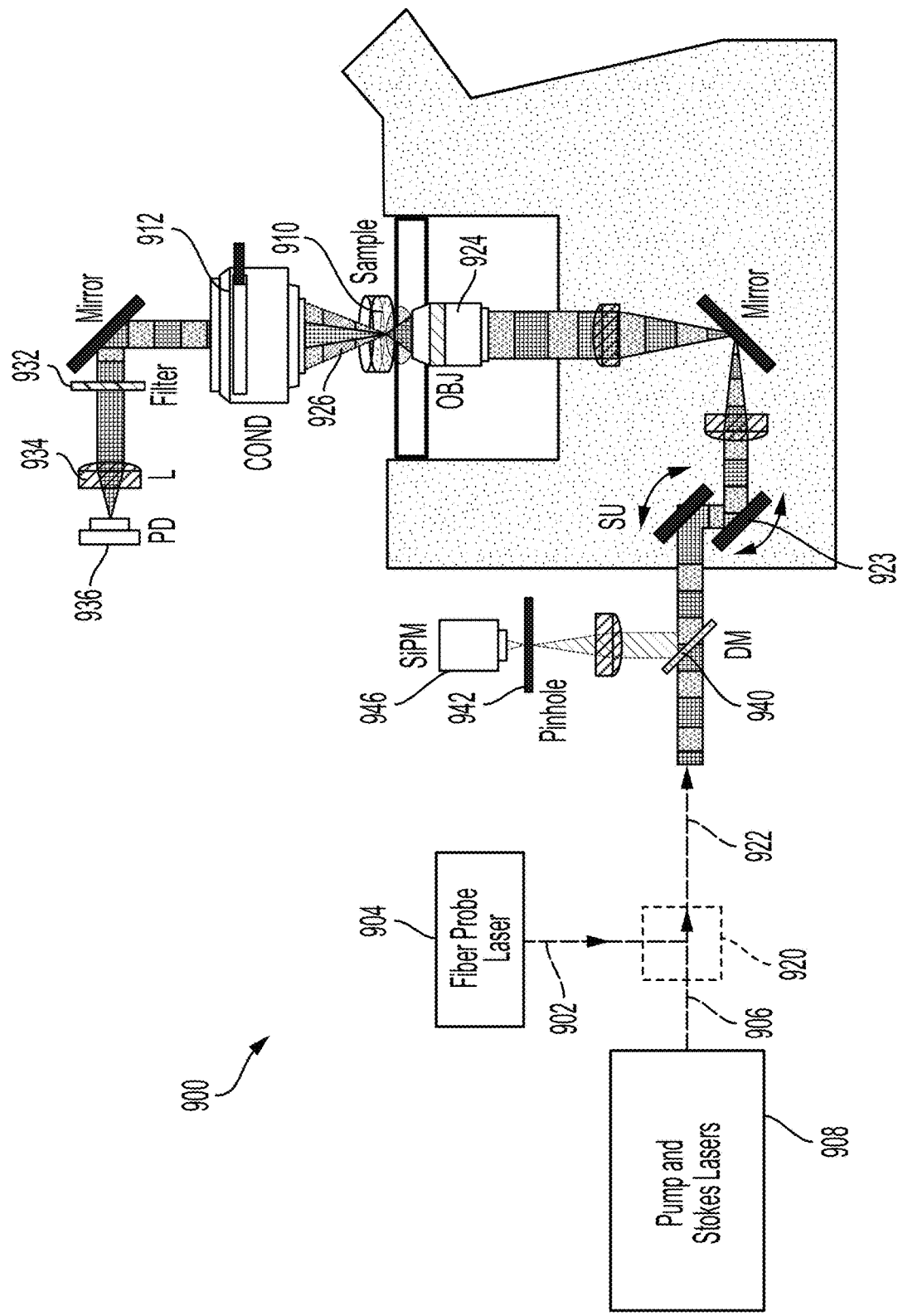
FIG. 9 is a schematic of another embodiment of an SRP microscope in accordance with the subject technology.

Referring now to FIG. 9, another embodiment of an SRP microscope 900 in accordance with the subject technology is shown. The SRP microscope 900 can be similar to the microscope 200, except as otherwise shown and described. In particular, the microscope 900 uses a probe beam 902 from a fiber laser source 904 as the a replacement for the probe beam 208 laser 201c. Further, the microscope 900 uses a long working distance air condenser 912 for probe beam collection, discussed in more detail below.

In general, the modulated Stokes and pump beam 906 (from pump and stokes lasers 908) induces an SRP signal from the sample 910 which is detected using the probe beam 902 of the fiber probe laser 904. The probe beam 902 is used to sense the thermal effect induced in the sample 910 by the stimulated Raman gain and loss processes (from combined beam 906). Thus, the signal to noise ratio is much less dependent on the noise in the fiber laser 904. Therefore, no balance detection system is needed. Moreover, the SRP signal is essentially a phase modulation signal, and therefore can be collected via an air condenser 912.

The microscope 900 can utilize a wave probe laser (904) at 765 nm (e.g. TLB6712-D; Spectral Physics) with the probe laser 902 being colinear with the pump and Stokes beams 906 (e.g. Picus Duo, Refined Laser Systems) through a polarized beam splitter 920. The resulting beam 922 can be scanned by scanning unit 923 and then be focused on the sample 910 using a high numerical aperture (NA) water objective 924 (e.g. UPlanApo 60XW, NA 1.2, Olympus). In the forward detection, the output beams 926 were collected by the air condenser 930 (e.g., NA 0.55, Nikon), passing through a 770 nm bandpass filter 932 (e.g. FB770-10-Ø1", Thorlabs) and lens 934 and then detected by a silicon photodiode 936 to create the SRP contrast. The backward detection employs a dichroic mirror 940, a pinhole 942, and a silicon photomultiplier 946 for confocal fluorescence scheme and multimodal imaging. Many SRS and SRP setups utilize a configuration the sample is in contact on both sides with a high NA objective and an oil condenser. However, the microscope 900 uses a long working distance air condenser 912 for forward direction probe beam collection, facilitating live cell imaging and large area tissue screening, compatible with most fluorescence setups.

Unlike SRS imaging, which detects a small modulation on the local oscillator, SRP is intrinsically immune to the fiber laser noise as it utilizes a third beam (probe beam 902) to probe SRS deposited heat. Thus, the fiber laser-based SRP eliminates the need for balance detection techniques. Meanwhile, through sensitive thermal lensing detection, SRP achieved superior sensitivity in media with high thermosoptic coefficients.

To demonstrate, we compared the performance of SRS and SRP in detecting dimethyl sulfoxide C—H symmetric stretching. SRS was performed with a high NA condenser (e.g. Aplanat Achromat 1.4, NA 1.4, Olympus) collection and SRP with a low NA air condenser collection. SRS without balancing only provided a signal-to-noise ratio (SNR) of 87.6, which suffers from the high laser noise in the detected pump beam. With auto-balance detection, SRS SNR performance improved to 742. Under the excitation power, SRP could provide an SNR as high as 3300, which enabled a sensitive detection for biomolecules.

In SRS microscopy, precise alignment and focusing of high numerical aperture (NA) objectives and condensers are crucial. This meticulous setup is necessary to minimize light collection loss and prevent the introduction of non-vibrational backgrounds, such as cross-phase modulation (XPM), which can significantly distort spectral information. Contrastingly, in SRP microscopy, which leverages thermal lensing detection, there is a shift in requirements. SRP necessitates only a low NA collector, which simplifies the setup process and permits the utilization of an intact, long working distance air condenser. This more relaxed setup does not compromise the quality of SRP imaging; it still achieves high-quality images and maintains spectral fidelity. Conversely, SRS often struggles with the interference of parasitic XPM backgrounds, leading to a loss of chemical information.

Fiber laser-based SRP opens new opportunities for biological applications with its sensitivity and full spectrum detection ability. We applied this new technique to two types of biological samples, bladder cancer cell T24 and breast cancer tissue samples. Both are immersed in glycerol-d8 to enhance the thermal lensing effect. The resulting images showed that fiber laser-based SRP could provide a detailed sub-cellular map with vibrational information, which could be used for decomposing the chemical content and providing quantitative results. Our approach also facilitates large-area tissue screening, as evidenced by the mapping of biomolecule distributions such as lipids and proteins in cancer tissues, along with the capability for broadband detection in the fingerprint region.

In summary, the fiber laser-based SRP microscope presents a significant advancement in biological microscopy, offering enhanced sensitivity, full-spectrum detection, and user-friendly operation, potentially revolutionizing the field of biological imaging and analysis.

All references cited herein are incorporated by reference, as though fully set forth herein. All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A stimulated Raman photothermal (SRP) microscope for imaging a sample, comprising: a first optical source emitting an intensity-modulated pump beam; a second optical source emitting an intensity-modulated Stokes beam, wherein the Stokes beam is combined with the pump beam to form a combined beam, the combined beam being directed to the sample to induce a thermal effect caused by the stimulated Raman process; a third optical source emitting a probe beam, wherein the probe beam is directed to the sample; and an optical detect or configured to detect modulation of the probe beam after modulation by the sample to measure an SRP signal.

2. The microscope of claim 1, wherein the probe beam is directed to the sample colinear with the combined beam.

3. The microscope of claim 2, further comprising at least one lens positioned within an optical path of the combined beam and probe beam, wherein the at least one lens adjusts the collimation of the probe beam to make the probe beam focus axially off a focus of the combined beam.

4. The microscope of claim 1, wherein the duty cycle of the probe beam is between 5-10%.

5. The microscope of claim 1, wherein the microscope further comprises a glycerol based medium for mounting the sample.

6. The microscope of claim 1, wherein the probe beam has a different wavelength than the pump and Stokes beams.

7. The microscope of claim 6, further comprising at least one scanning mirror configured to scan the sample with the combined beam and the probe beam.

8. The microscope of claim 1, wherein the modulation frequency of the probe beam is at least 125 kHz.

9. The microscope of claim 1, further comprising a spectral filter, wherein the optical detector detects the probe beam after modulation by the sample and filtering by the spectral filter.

10. The microscope of claim 1, wherein the measured SRP signal is based on the local refractive index modulation of the sample, determined from the detected probe beam.

11. The microscope of claim 1, wherein the third optical source is a fiber laser.

12. The microscope of claim 11, further comprising an air condenser configured to collect the probe beam after modulation by the sample, and before the probe beam is detected by the optical detector.

13. A stimulated Raman photothermal (SRP) microscope for imaging a sample, comprising: a first optical source emitting an intensity-modulated pump beam; a second optical source emitting an intensity-modulated Stokes beam, wherein the Stokes beam is combined with the pump beam to form a combined beam, the combined beam being directed to the sample to induce a thermal effect caused by the stimulated Raman process; a fiber laser emitting a probe beam, wherein the probe beam is directed to the sample; and a photodiode configured to detect modulation of the probe beam after modulation by the sample to measure an SRP signal.

14. The microscope of claim 13, wherein:
the photodiode is part of a forward detection system; and
the microscope further comprises a back detection system including a pin hole and a photomultiplier; and
the duty cycle of the probe beam is between 5-10%.

15. The microscope of claim 13, further comprising an air condenser configured to collect the probe beam after modulation by the sample and before the probe beam is detected by the photodiode.

16. The microscope of claim 13, wherein:
the probe beam is directed to the sample colinear with the combined beam; and
the microscope further comprises at least one lens positioned within an optical path of the combined beam and probe beam, wherein the at least one lens adjusts the collimation of the probe beam to make the probe beam focus axially off a focus of the combined beam.

17. The microscope of claim 13, wherein the microscope further comprises a glycerol based medium for mounting the sample.

18. The microscope of claim 13, wherein:
the probe beam has a different wavelength than the pump and Stokes beams; and
the microscope further comprises at least one scanning mirror configured to scan the sample with the combined beam and the probe beam.

19. The microscope of claim 13, further comprising a spectral filter, wherein the optical detector detects the probe beam after modulation by the sample and filtering by the spectral filter.

20. The microscope of claim 13, wherein the measured SRP signal is based on the local refractive index modulation of the sample, determined from the detected probe beam.

* * * * *